(12) United States Patent
Gamache

(10) Patent No.: US 11,340,173 B2
(45) Date of Patent: May 24, 2022

(54) EMISSION-BASED DETECTOR FOR CAPILLARY GAS CHROMATOGRAPHY

(71) Applicant: Mecanique Analytique Inc., Thetford-Mines (CA)

(72) Inventor: Yves Gamache, Thetford-Mines (CA)

(73) Assignee: MECANIQUE ANALYTIQUE INC., Thetford Mines (CA)

( * ) Notice: Subject to any disclaimer, the term of this patent is extended or adjusted under 35 U.S.C. 154(b) by 945 days.

(21) Appl. No.: 15/737,354

(22) PCT Filed: Jun. 23, 2016

(86) PCT No.: PCT/CA2016/050735
§ 371 (c)(1),
(2) Date: Dec. 18, 2017

(87) PCT Pub. No.: WO2017/008146
PCT Pub. Date: Jan. 19, 2017

(65) Prior Publication Data
US 2018/0164219 A1    Jun. 14, 2018

Related U.S. Application Data
(60) Provisional application No. 62/192,867, filed on Jul. 15, 2015.

(51) Int. Cl.
*G01N 21/67* (2006.01)
*G01N 30/74* (2006.01)
(Continued)

(52) U.S. Cl.
CPC .............. *G01N 21/67* (2013.01); *G01N 30/74* (2013.01); *G01N 30/6095* (2013.01); *G01N 30/64* (2013.01); *G01N 2030/025* (2013.01)

(58) Field of Classification Search
CPC ........ G01N 21/67; G01N 30/74; G01N 30/64; G01N 30/6095; G01N 2030/025
(Continued)

(56) References Cited

U.S. PATENT DOCUMENTS 4,509,855 A * 4/1985 Gay ...................... G01N 30/74
356/316
4,851,683 A    7/1989 Yang et al.
(Continued)

FOREIGN PATENT DOCUMENTS

WO    2005024387 A2    3/2005

OTHER PUBLICATIONS

First Office Action issued by the Chinese National Intellectual Property Administration for Chinese Application No. 201680041503.0, dated Mar. 18, 2020, 21 pages.
(Continued)

*Primary Examiner* — Marrit Eyassu
(74) *Attorney, Agent, or Firm* — Eversheds Sutherland (US) LLP

(57) ABSTRACT

An emission-based detector for use in conjunction with capillary chromatography or other applications involving a gas sample having a small volume is provided. The detector is based on optical emission from a plasma medium. An optical cartridge or other detection and/or processing means may be provided to receive and analyse the emitted radiation and thereby obtain information on the gas to be analysed. The emission-based detector includes a gas inlet, a gas outlet and a capillary channel which is in fluid communication with the gas inlet and gas outlet. The capillary channel acts as the plasma chamber. Preferably, the capillary channel has transversal dimensions of the same order as the cross-section of typical chromatography capillary columns and defines a winding path within the detection area. A multi-cell emis-
(Continued)

sion-based detector and a method of analysing a gas sample using multiple detection cells are also provided.

24 Claims, 20 Drawing Sheets

(51) Int. Cl.
*G01N 30/02* (2006.01)
*G01N 30/64* (2006.01)
*G01N 30/60* (2006.01)

(58) Field of Classification Search
USPC ........................................................ 73/23.37
See application file for complete search history.

(56) References Cited

U.S. PATENT DOCUMENTS

| | | | | |
|---|---|---|---|---|
| 5,051,557 | A * | 9/1991 | Satzger | H01J 49/105 219/121.52 |
| 5,570,179 | A * | 10/1996 | Weckstrom | G01N 21/69 356/311 |
| 2003/0188587 | A1* | 10/2003 | Manz | B01L 5/00 73/863.12 |
| 2005/0195393 | A1* | 9/2005 | Karanassios | H01J 49/0013 356/316 |
| 2009/0132206 | A1 | 5/2009 | Gamache et al. | |
| 2009/0165642 | A1 | 7/2009 | Gamache et al. | |
| 2010/0045159 | A1* | 2/2010 | McBrady | G01N 30/64 313/356 |
| 2011/0316552 | A1* | 12/2011 | Shinada | G01N 27/70 324/464 |
| 2014/0160477 | A1* | 6/2014 | Paradis | G01N 21/68 356/402 |
| 2017/0021326 | A1* | 1/2017 | Locke | B01J 19/088 |
| 2018/0164261 | A1* | 6/2018 | Fan | G01N 30/6095 |

OTHER PUBLICATIONS

Extended European Search Report and Opinion issued in connection with corresponding EP Application No. 16823581.0 dated Mar. 4, 2019 (13 pages).

Li, Chenghui et al., Dieletric Barrier Discharge Molecular Emission Spectrometer as Gas Chromatographic Detector for Amines, Microchemical Journal, Mar. 2015, pp. 108-113, vol. 119.

International Search Report and Written Opinion for International Application No. PCT/CA2016/050735, dated Sep. 8, 2016.

* cited by examiner

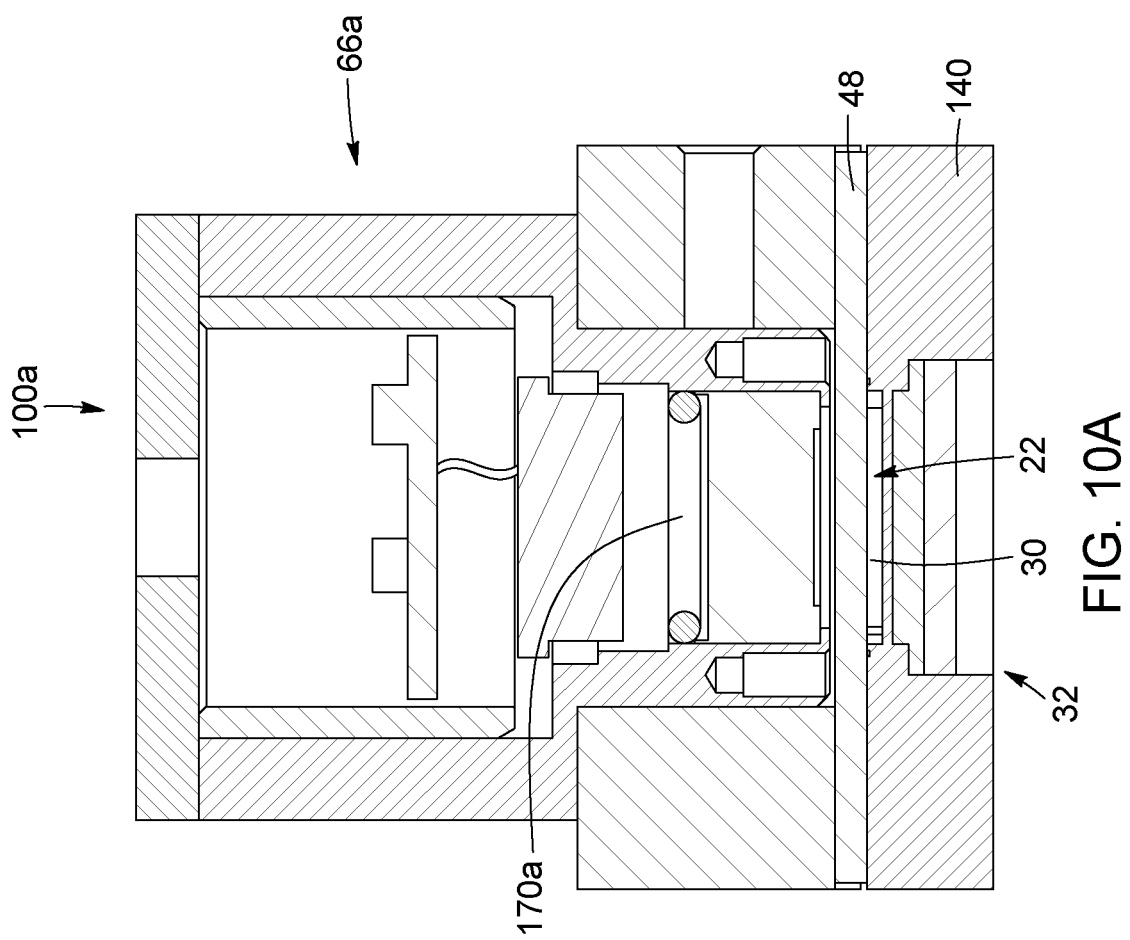

EMISSION-BASED DETECTOR FOR CAPILLARY GAS CHROMATOGRAPHY

CROSS REFERENCE TO RELATED APPLICATIONS

This application claims the benefit of priority to U.S. Provisional Application No. 62/192,867, filed Jul. 15, 2015, which is incorporated by reference herein in its entirety, and is a 35 U.S.C. § 371 national stage application of PCT Patent Application No. PCT/CA2016/050735, filed Jun. 23, 2016, which is incorporated by reference in its entirety.

TECHNICAL FIELD

The technical field generally relates to detectors for gas chromatography or similar applications, and more particularly to emission-based detectors suitable for use with chromatography columns of capillary dimensions.

BACKGROUND

In Gas Chromatography (GC) systems using capillary columns, the volume of an outputted sample is very small when compared to gas flow out of typical packed columns. Capillary columns typically have an internal diameter ranging from 0.12 to 0.5 mm, and therefore have a small cross sectional area. In such circumstances, the internal volume of the detector used to analyse the sample may become an issue. As traditional detectors are designed to handle much larger volumes, the sample from a capillary column tends to be diluted within the large space inside the detector, reducing the system sensitivity. In addition, the large internal space of the detector acts as a "buffer" or "reservoir", which leads to a lower fluid velocity of the sample, broadening the detected peaks.

Practical considerations make it difficult to reduce the internal space of the detector without jeopardizing the peak shape and sensitivity.

In order to reduce the peak broadening issue exposed above, it is known in the art to add a flow of "make-up gas" to the carrier gas flow upstream of the detector. FIG. 1 (PRIOR ART) illustrates the flow process for such configurations. The make-up gas is the same species as the carrier gas and therefore increases the sample flow through the detector, which indeed reduces the peak residence time of impurities inside the detector. However, it also contributes to reducing the sensitivity of the detection process, since the extra flow dilutes the sample. This approach also has the drawback of consuming extra quantities of carrier gas.

It is also known in the art to use "micro" detectors, typically based on thermal conductivity, in conjunction with capillary GC columns. The sensitivity of such detectors is however generally low and they are useful only for high ppm values and percentage measurement.

Mass spectrometers can also be used to analyse samples from capillary columns and can provide excellent results, especially when high sensitivity is required. However, investing in a mass spectrometer may significantly increase the cost of a system. Mass spectrometers can also be bulky and require qualified personnel for operation and maintenance.

In view of the above, there remains a need for gas detectors suitable for use with capillary GC columns or the like.

SUMMARY

In accordance with one aspect, there is provided an emission-based detector for use in conjunction with capillary chromatography or other applications involving a gas sample having a small volume.

In some implementation the detector is based on optical emission from a plasma medium, and preferably includes a plasma-generating mechanism relying on Dielectric Barrier Discharge (DBD). An optical cartridge or other detection and/or processing means may be provided to receive and analyse the emitted radiation and thereby obtain information on the gas to be analysed.

In some implementation the emission-based detector includes a gas inlet, a gas outlet and a capillary channel which is in fluid communication with the gas inlet and gas outlet. The capillary channel acts as the plasma chamber. Preferably, the capillary channel has transversal dimensions of the same order as the cross-section of typical chromatography capillary columns. Further preferably, the capillary channel defines a winding path within the detection area.

In accordance with one aspect, there is provided an emission-based detector for analysing a gas sample. The emission-based detector includes a detection area having a gas inlet, a gas outlet and a capillary channel in fluid communication with the gas inlet and gas outlet to allow circulation of the gas sample therebetween. The capillary channel defines a plasma chamber. The emission-based detector further includes a plasma-generating mechanism configured to apply a plasma-generating field across the plasma chamber so as to generate a plasma from the gas sample. The emission-based detector also includes a detector window allowing optical emissions from the plasma to exit the plasma chamber.

In accordance with another aspect, there is provided a multi-cell emission-based detector for analysing a gas sample, including a plurality of detection cells connected in series. Each detection cell includes a detection area having a gas inlet, a gas outlet and a capillary channel in fluid communication with the gas inlet and gas outlet to allow circulation of the gas sample therebetween, the capillary channel defining a plasma chamber. Each detection cell further includes a plasma-generating mechanism configured to apply a plasma-generating field across the plasma chamber so as to generate a plasma from said gas sample. A detector window allows optical emissions from the plasma to exit the plasma chamber, and an optical cartridge is coupled to the detector window for collecting these optical emissions.

In accordance with yet another aspect, there is also provided a method of analysing a gas sample, including the following steps:

a. providing multiple detection cells each configured to generate a plasma from said gas sample and to collect optical emissions from said plasma;

b. successively circulating the gas sample through each of said detection cells;

c. adding a doping agent to the gas sample between circulation of said gas sample through consecutive ones of said multiple detection cells; and d. measuring different optical properties of optical emissions collected from different ones of said detection cells.

Other features and aspects of the invention will be better understood upon a reading of preferred embodiments thereof with reference to the appended drawings.

BRIEF DESCRIPTION OF THE DRAWINGS

FIG. 10A is a cross-sectional view along lines A-A of the multi-cell emission-based detector of FIG. 10.

DETAILED DESCRIPTION

In accordance with one aspect, there is provided an emission-based detector for analysing a gas sample. Such an emission-based detector may be of particular use in chromatography applications using capillary-type columns, also referred to as capillary chromatography, and may also be useful for online measurements or other applications involving a small sample volume.

Chromatography is a technical field where constituents of a gas sample are separated in order to be individually and sequentially analysed. In some implementations, therefore, the emission-based detectors described herein may be used to detect and analyse the components of a gas sample outputted by a chromatography column. Typically, the gas stream outputted by a chromatography column includes one or more impurities or species to be detected carried by a carrier gas, different species being outputted at different moments in time as impurity "peaks". The species to be detected may for example be hydrogen ($H_2$), argon (Ar), oxygen ($O_2$), methane ($CH_4$), carbon monoxide (CO), carbon dioxide $CO_2$), water ($H_2O$), hydrocarbons, BTEX compounds, etc. Different types of carrier gases may also be selected depending on the application and the particularities of a given chromatography system. Typical carrier gases include argon (Ar), helium (He), nitrogen ($N_2$), hydrogen ($H_2$) and oxygen ($O_2$).

Emission-based detectors according to embodiments described herein may be particularly useful in applications wherein the sample is outputted by a capillary-type column. Capillary columns typically have an internal diameter ranging from 0.12 to 0.5 mm and their cross-section area is of the order of 0.01 to 0.2 $mm^2$. It will be readily understood that these dimensions are given by way of example only and that detectors according to some embodiments may be used in conjunction with capillary chromatography column of different sizes without departing from the scope of the invention.

It will furthermore be readily understood that in other implementations, the emission-based detectors described herein may be of use in other technical fields, in particular where small sample volumes are at play. Such fields include for example gas purification systems, gas leak detection systems, online gas analysers without chromatographic separation, and the like.

Detector Configuration

Figure 1:
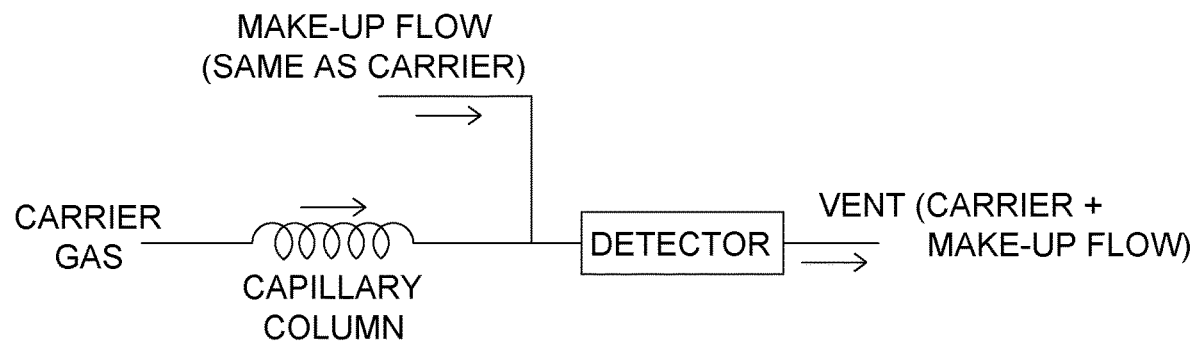
FIG. 1 (PRIOR ART) is a schematized representation of the use of a make-up carrier flow in gas chromatography applications according to prior art.
Figure 2:
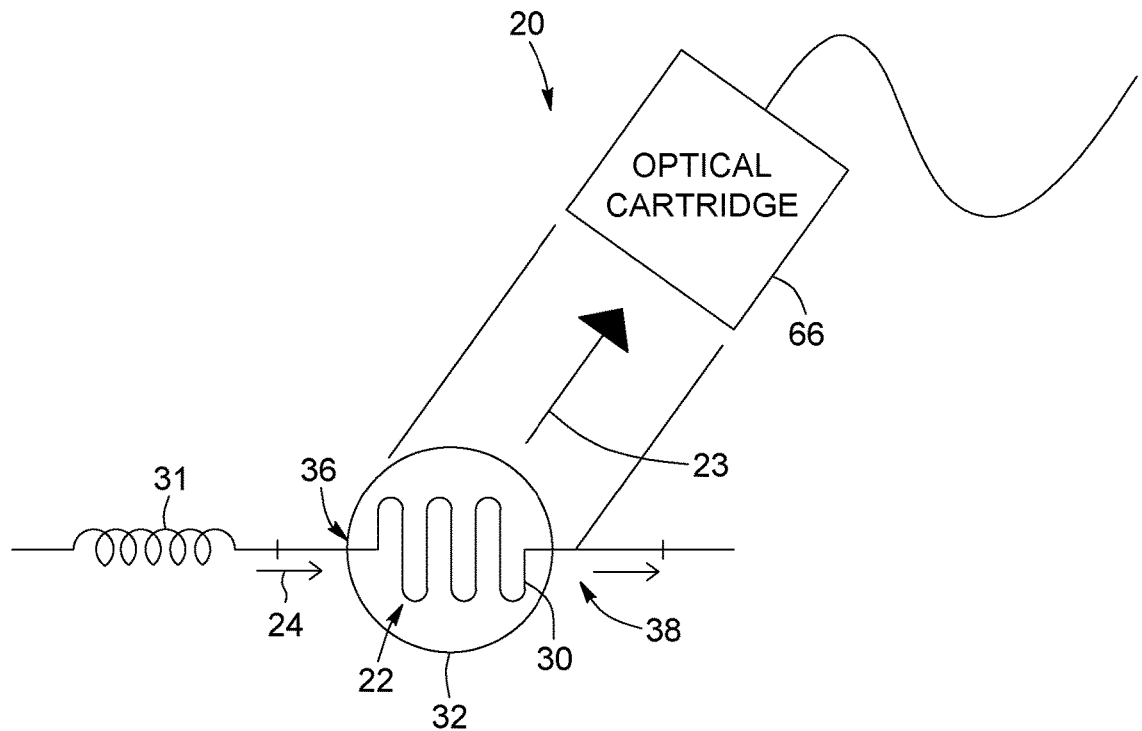
FIG. 2 is a schematized representation of the principle of operation of an emission-based detector according to embodiments of the invention.

Referring to FIG. 2, the general configuration and operation of an emission-based detector 20 according to one embodiment is shown in a schematized fashion.

The emission-based detector 20 according to implementations of the invention includes a detection area 32 having a gas inlet 36, a gas outlet 38 and a capillary channel 30 in fluid communication with the gas inlet 36 and gas outlet 38 to allow circulation of the gas sample 24 therebetween. The configuration of the capillary channel 30 according to exemplary implementations will be described further below. The capillary channel 30 defines a plasma chamber 22, and the emission-based detector 20 further includes a plasma-generating mechanism (not shown in FIG. 2) configured to apply a plasma-generating field across the plasma chamber 22 so as to generate a plasma from the gas sample 24. The gas sample 24 therefore undergoes a transformation under the applied plasma-generating field. Chemical compounds are ionised and decomposed by collisions with energetic electrons and molecules and atomic components are excited to higher energy levels, emitting radiation in the de-excitation process characteristic of the spectral properties of the species present in the gas sample 24. A detector window 48 (see FIG. 4) allows optical emissions 23 from the plasma to exit the plasma chamber 22. An optical cartridge 66 or other detection and/or processing means may be provided to receive and analyze the optical emissions 23 from the plasma and thereby obtain information on the nature and relative concentration of the species in the gas to be analysed.

Figure 3:
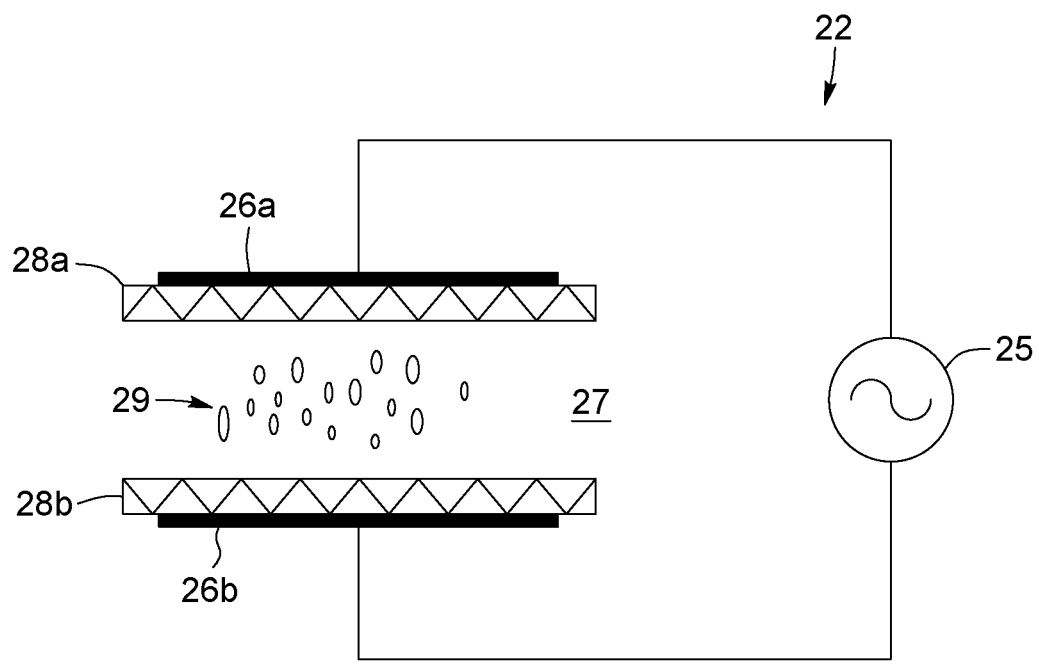
FIG. 3 (PRIOR ART) illustrates the generation of a plasma through Dielectric Barrier Discharge as known in the art.

In some implementations, the plasma-generating mechanism relies on a Dielectric Barrier Discharge (DBD). In order to better understand the principle behind such a mechanism, an example of a plasma chamber 22 in a DBD configuration is schematically illustrated in FIG. 3 (PRIOR ART). DBD involves the use of a pair of discharge electrodes 26a, 26b separated by a discharge gap 27, leading to the breakdown of the discharge gas 29 and the creation of a plasma medium in the discharge gap 27. This high ignition potential produces ionisation of the gas and the resulting electrons and ions travel towards the opposite polarity discharge electrodes 26a, 26b, charging the respective discharge electrodes 26a, 26b positively and negatively, producing a decrease of the applied electrical potential that in turn conducts to extinguish the plasma. The presence of the dielectric barrier limits the average current density in the plasma. It also isolates the discharge electrodes from the plasma, avoiding sputtering or erosion. When the discharge driving signal polarity is reversed, the applied potential and the memory potential due to charge accumulation on the surface of the dielectric barriers 28a, 28b are added and the discharge starts again. The potential required to sustain the plasma is therefore lower than the initially required potential for ignition.

The plasma-generating process therefore begins with the applying of a plasma-generating electrical field across the plasma chamber 22 that transfers enough energy to free electrons in the discharge gap 27 so that they ionize particles of the gas sample through collisions. From that point an avalanche occurs and other ionisation mechanism can take place. Such mechanisms include, but not limited to:

Direct ionization by electron impact. This mechanism involves the ionization of neutral and previously unexcited atoms, radicals, or molecules by an electron whose energy is high enough to provide the ionization act in one collision. These processes can be dominant in cold or non-thermal discharges, where electrical fields and therefore electron energies are quite high, but where the excitation level of neutral species is relatively moderate;

Ionization by collision of heavy particles. This takes place during ion-molecule or ion-atom collisions, as well as in collisions of electronically or vibrationally excited species, when the total energy of the collision partners exceeds the ionization potential. The chemical energy of colliding neutral species can also contribute to ionization in so-called associative ionization processes;

Photo-ionization refers to the excitation of neutrals by photons, which result in the formation of an electron-ion pair. Photo-ionization can be dominant in thermal plasmas but may also play a significant role in regard to the mechanisms of propagation of non-thermal discharges;

Surface ionization (electron emission). This process is provided by electron, ion, and photon collisions with different surfaces or simply by surface heating;

Penning ionization is a two (2) steps ionisation process involving a gas mixture. For example, the gas detector may operate with a doping gas such as He or Ar added to the detector entrance and mixed to the flow of carrier gas. Direct ionisation by electron impact first provides excited atoms. These electronically excited atoms interact with a target molecule, the collision resulting in the ionization of the molecule yielding a cation, an electron, and a neutral gas molecule, in the ground state.

In the context of emission-based detectors such as described herein, the discharge gas 29 is embodied by the gas sample passing through the plasma chamber. As mentioned above, the gas sample may for example be embodied by solute from a capillary gas chromatography system, or other gas samples whose composition is to be analysed. Typically, the gas sample includes a carrier gas of a known nature (such as for example He, Ar, $N_2$, $CO_2$, $H_2$, $O_2$, etc.), in which are present impurities to be identified and/or measured. As mentioned above, the impurities may for example be embodied by hydrocarbons, $H_2$, Ar, $O_2$, $CH_4$, CO, $CO_2$, $H_2O$, BTEX compounds, and the like It will however be readily understood by one skilled in the art that in other embodiments a different configuration or different plasma-generating mechanism may be provided without departing from the scope of the invention. By way of example, in some implementations the plasma chamber of the DBD mechanism may have only one electrode isolated from the gas, and therefore a single dielectric barrier. In one example, one wall of the plasma chamber may be made of conductive material and therefore act as the second electrode, in contact with the gas to be ionized. Various frequency ranges for the alternating field may also be used. In other implementations, direct DC or AC discharge could also be used. It has the benefit to reduce the starting discharge potential, while adding more free electrons to the system, improving ionization process. However, DC discharges are prone to electrode sputtering resulting in more frequent maintenance period. With direct AC the field excitation frequency plays a role. Higher frequency excitation results in higher rate of electrode sputtering due to the creation of a DC sheath where local electrons are oscillating close to electrode and hit it at higher rate. At low frequency, the electrons follow the excitation field.

Returning to FIG. 2, and as mentioned above, the detection area 32 of the emission-based detector 20 includes a capillary channel 30 acting as the plasma chamber 22. Preferably, the capillary channel 30 follows a winding path within the detection area 32, so as to increase the length of the plasma chamber 22 and therefore the quantity of gas sample within the detection area 32 without diluting the sample in a larger volume. In the illustrated embodiment, the winding path of the capillary channel 30 defines a boustrophedonic (i.e. forming alternate lines in opposite directions, as reminiscent of a plowed field) or "zigzag" trajectory, but it will be readily understood that in other implementations the path of the capillary channel 30 through the detection area 32 may be different without departing from the scope of the invention.

In some implementations, the gas inlet 36 is configured to receive the gas sample 24 from a gas chromatography capillary column 31, and the capillary channel 30 has transversal dimensions of a same order as the gas chromatography capillary column 31, or of a same order as the cross-section of typical chromatography capillary columns. For example, the capillary channel has transversal dimensions of about 0.5 $mm^2$ or less. Preferably, the capillary channel has a cross-section area between about 0.01 $mm^2$ and 0.20 $mm^2$.

As will be readily understood by one skilled in the art, the use of a capillary channel 30 such as described may allow a sufficient amount of sample within the detection area to provide a detectable signal, while avoiding the dilution of this sample in a large volume. Furthermore, the linear velocity of the gas sample can be substantially unchanged in passing from the capillary column 31 to the detector 20, resulting in an improved peak shape compared to prior art detector configurations.

The length of the capillary channel 30 within the detection area 32 may be designed with a view to optimize the strength of the optical emissions 23 from the impurities to be detected in the sample. On the one hand, a longer path increases the amount of sample gas within the detection area 32 and therefore the strength of the overall optical emissions 23 from the plasma. On the other hand, if the length of the gas path within the detection area 32 is greater than the travelling distance of an impurity peak, then optical emissions 23 from the carrier gas flow before and/or after the impurity peak may add noise to the detected peak. The length of the capillary channel 30 is therefore preferably selected in view of the width of the travelling impurity peaks so as to minimize the ratio of the carrier gas emission relative to the impurity emission. Preferably, in some embodiments the capillary channel 30 has a length within the detection area 32 such that a path of the gas sample within the detection area substantially corresponds to a width of an impurity peak in the gas sample 24.

Exemplary Embodiments

Referring to FIGS. 4, 4A, 4B and 4C, an emission-based detector 20 according to one embodiment is shown and is described below.

In this embodiment, the emission-based detector 20 includes a base plate 40 hosting the plasma chamber 22. In the illustrated embodiment the base plate 40 is shaped as a thick rectangular plate having a top surface 42, a bottom surface 44 and a peripheral side wall 46, but of course other shapes could be used in other variants. It will be readily understood that the use of the expressions "top" bottom" and "side" throughout the present description is for ease of reference only and is not meant to impart any preferential orientation to the emission-based detector or its components. The base plate 40 includes a groove in the top surface 42 defining a capillary channel 30. The capillary channel 30 preferably forms a winding path and defines a plasma chamber 22, as explained above. A gas inlet 36 and a gas outlet 38 are provided through the side wall 46 on opposite sides of the base plate 40, and are both in fluid communication with the capillary channel 30, as best seen in FIG. 4C. Gas can therefore flow through the base plate 40 from the gas inlet 36, along the winding path defined by the capillary channel 30 and out through the gas outlet 38. The base plate 40 can for example be made entirely or in part of PEEK (polyether ether ketone) or other plastic or insulating material, such as for example ceramic, which can advantageously withstand high temperature implementations. Alternatively, the base plate 40 or a portion thereof may be made of a conductive material and act as a non-isolated discharge electrode.

The emission-based detector 20 further includes a detector window 48 extending on the top surface 42 of the base plate 40, at least over the capillary channel 30. The detector window 48 therefore closes-off the groove to form the plasma chamber 22. The detector window 48 is preferably made of a material transparent to light, at least within the spectral range of the plasma emissions to be observed. For example, the detector window 48 may be made of glass and may allow through light in the wavelength range of 300 to 700 nm. The detection window 48 may be sealed against the top surface 42 of the base plate 40 in a leak-preventing engagement, thereby avoiding both atmospheric contamination of the sample and outboard leaks. Preferably, the detector window 48 is covered with a conductive coating 50 on its surface opposite to the base plate 40, for example ITO (indium tin oxide) or another transparent alloy or conductor. An electrical wire (not shown) is bound on the ITO side of the window 48 and used as an electrical connection to a power generator. In this manner, on the top side of the plasma chamber 22 the detector window 48 can serve as the dielectric barrier of the DBD plasma-generating mechanism whereas the conductive coating 50 serves of the top discharge electrode. The conducting coating 50 is also preferably transparent within the spectral range of interest. The area of the top surface 42 of the base plate 40 occupied by the capillary channel 30 and covered by the detector window 48 defines the detection area 32 of the emission-based detector, from which optical emissions from the plasma can escape the plasma chamber 22 and be detected by a suitable system, as explained further below.

Preferably, the base plate 40 is machined from its bottom surface 44 to form a bottom cavity 54 extending in the bottom surface 44 in vertical alignment with the groove, therefore reducing the thickness of the base plate 40 under the capillary channel 30, this portion of the base plate 40 defining the dielectric barrier of the DBD plasma-generating mechanism on the bottom side the plasma chamber 22. In one implementation, a bottom groove 52 in line with the capillary channel 30 and following the same winding path is machined inside the bottom cavity 54, further reducing the thickness of the base plate 40 under the capillary channel 30 and therefore the thickness of the dielectric barrier. By providing a dielectric barrier as thin as possible a lower voltage can be used, reducing the electrical stress on the electronic generator components and the dielectric barrier. Such a configuration also favors the miniaturisation of the emission-based detector 20.

In some implementations a layer of a conductive epoxy compound 56 is applied inside the cavity 54, in order to fill the bottom groove 52. A ceramic-based conductive compound may also be used. An electrical wire (not shown) is also held in the cavity 54, by the conductive epoxy 56. This wire acts as the other electrical connection to the power generator. An electrically insulating compound 60 is preferably added over the conductive epoxy 56.

The plasma-generating mechanism preferably includes an AC generator 25 connected to the top and bottom discharge electrodes so as to apply an electrical field therebetween. In some implementations, the bottom discharge electrode, embodied by the conductive epoxy layer 56 in the bottom groove 52, is connected to the high voltage side of the AC generator 25, whereas the top discharge electrode, embodied by the conductive coating 50 on the detector window 48, is connected to ground. A suitable electrical field may therefore be applied across the capillary channel 30 to create a plasma discharge in the circulating gas sample, according to the principle explained above. To summarize, in this configuration the plasma-generating mechanism forms a Dielectric Barrier Discharge configuration which includes:

- a top discharge electrode defined by the conductive coating 50 extending over the detector window 48;
- a top dielectric barrier defined by the detector window 48; and
- a bottom dielectric barrier defined by the base plate 40 underneath the capillary channel 30; and
- a bottom discharge electrode defined by the layer of conductive epoxy compound 56 extending along the bottom surface 44 of the base plate 40.

As explained above it is known that the electrical power required to initially ignite the plasma discharge is greater than the electrical power required to maintain it, in some cases by as much as 50%. After the initial discharge ignition, the system impedance is drastically reduced and the energy supplied to the chamber which is not used to maintain the plasma is dissipated as heat, which can destabilize the plasma and lead to the formation of plasma arcs. To alleviate this drawback, in some implementations the plasma-generating mechanism may be further configured such that the applied plasma-generating field has a greater intensity proximate the gas inlet 36 than proximate the gas outlet 38.

Preferably, the intensity of the applied plasma-generating field may decrease progressively along the capillary channel from the gas inlet to the gas outlet.

Figure 5:
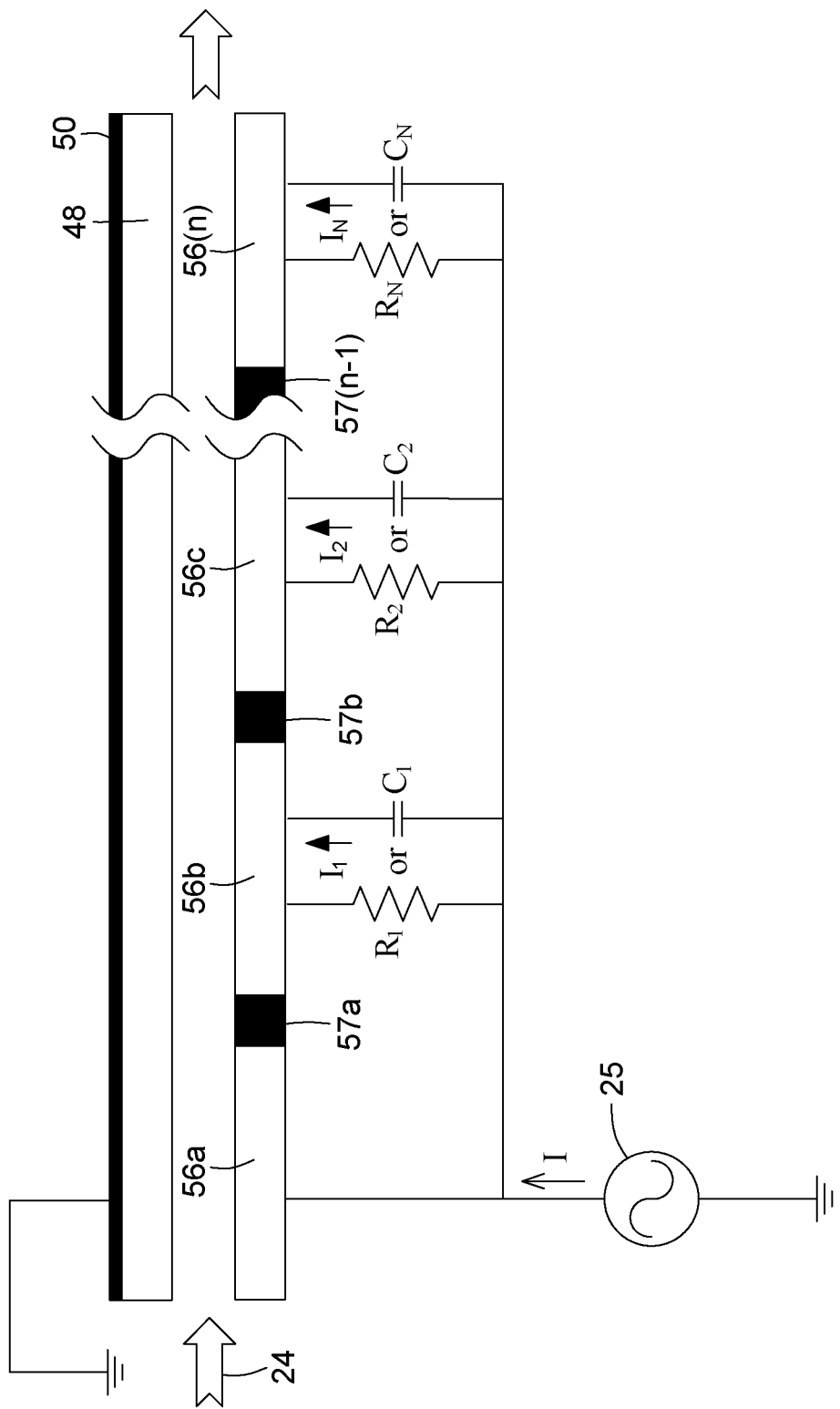
FIG. 5 is an electrical diagram showing the principle of operation of a plasma-generating mechanism applying a plasma-generating field of greater intensity proximate the gas inlet than proximate the gas outlet.

Referring to FIG. 5, there is shown an electrical diagram illustrating the principle explained above. In this configuration, the top electrode is embodied by the conductive coating 50 extending over the detector window 48, and is connected to ground, while the bottom electrode is divided into successive electrodes segments 56a, 56b, 56c, ..., 56(n) separated by insulting sections 57a, 57b, 57(n−1). Each electrode segment 56a, 56b, 56c, ..., 56(n) may be fed an electrical current I through different electrical resistance or capacitance, such that the impedance is lower in the electrode segment 56a near the gas inlet 36 and progressively increases from one electrode segment to the next. In one example the electrode segments 56a, 56b, 56c, ( ... ) may each be of identical design but may be connected to an AC generator 25 through external resistive elements $R_1, R_2, \ldots, R_N$ or capacitive elements $C_1, C_2, \ldots, C_N$ providing the desired progression ($R_1 > R_2 > R_N$; $C_1 < C_2 < C_N$) such that the current $I_1, I_2, \ldots, I_N$ fed to the electrode segments decrease progressively ($I_1 < I_2 < I_N$). Advantageously, such embodiments may improve the stability of the plasma discharge.

Figure 4:
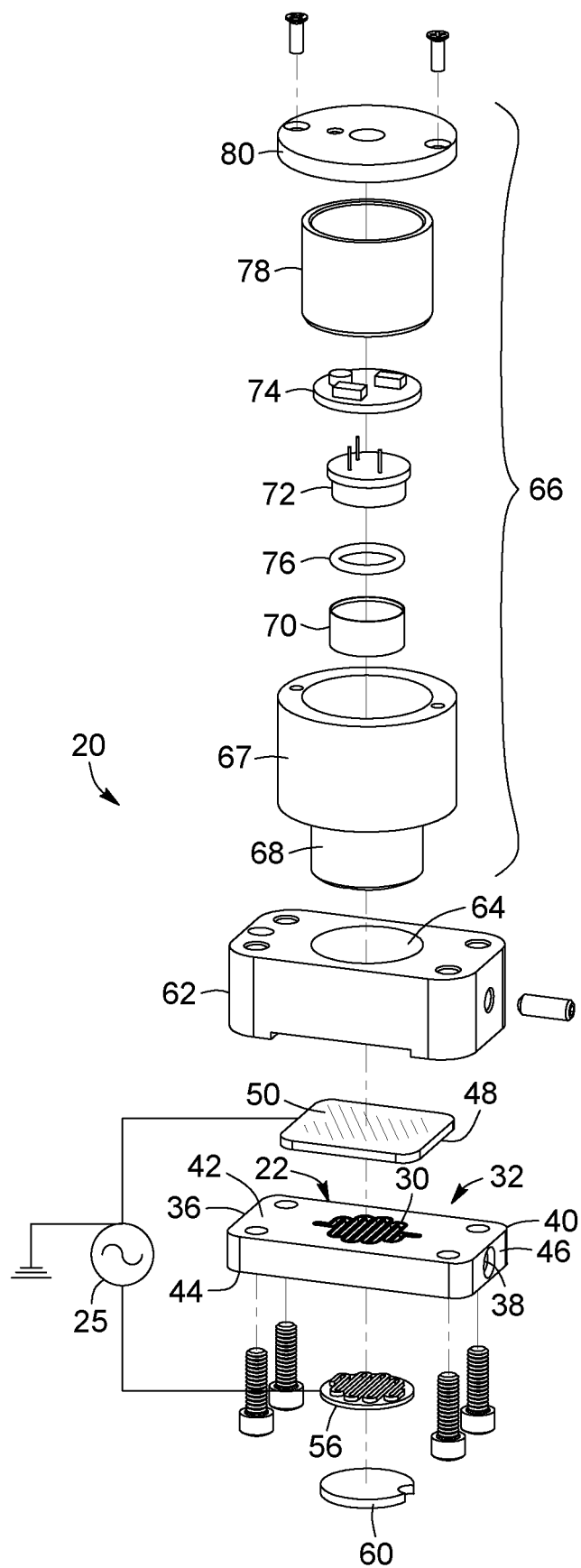
FIG. 4 is an exploded view of an emission-based detector according to one embodiment.
Figure 4A:
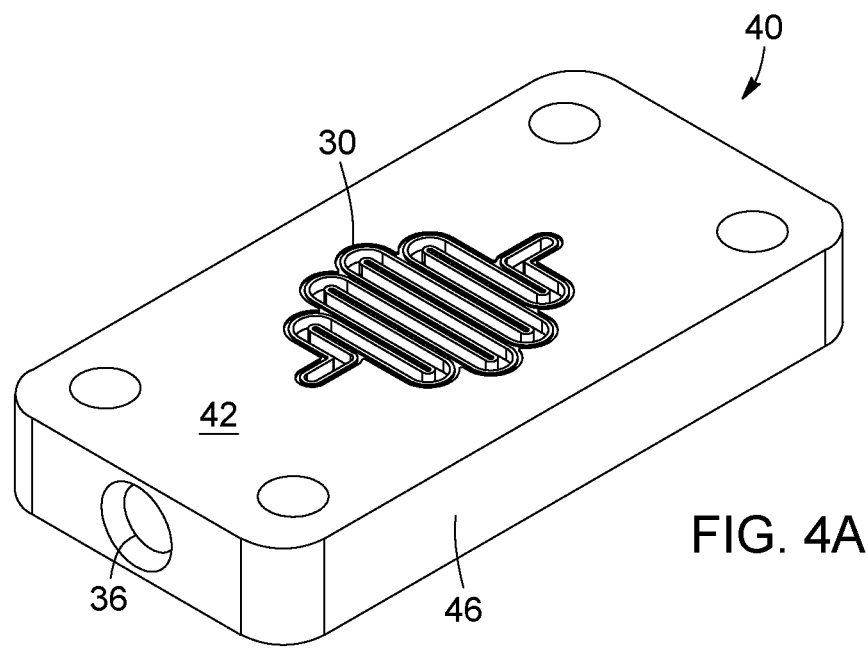
FIGS. 4A, 4B and 4C are respectively a top elevation view, a bottom elevation view and a cross-sectional view of the base plate of the emission-based detector of FIG. 4.
Figure 4B:
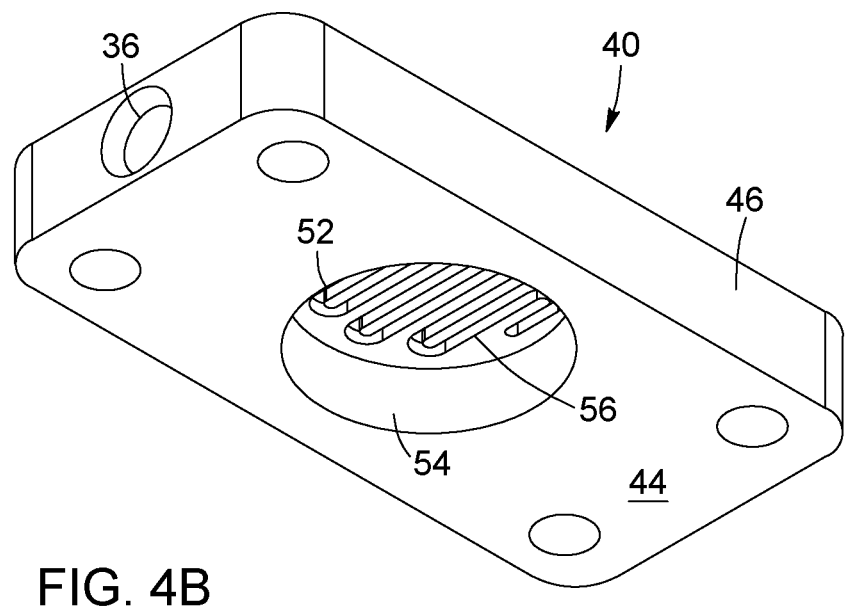
Figure 4C:
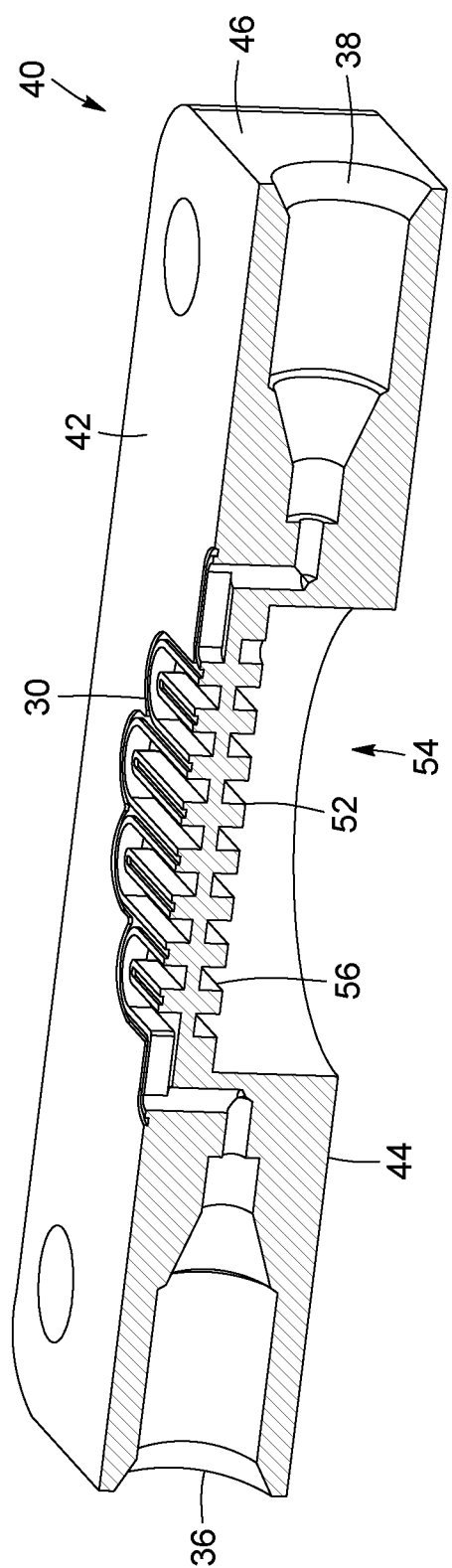
Figure 6:
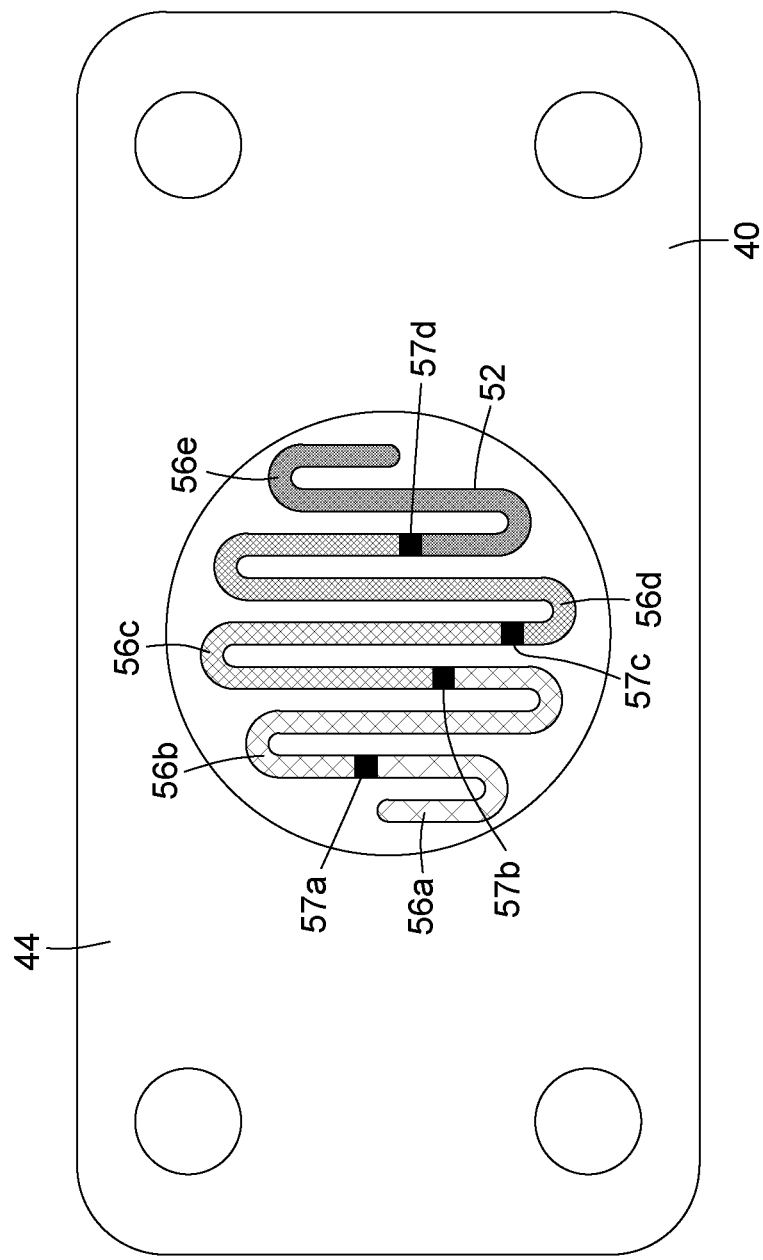
FIG. 6 is a bottom view of the base plate of the emission-based detector of FIG. 4 showing a plasma-generating mechanism applying a plasma-generating field of decreasing intensity from the gas inlet to the gas outlet, in accordance with one variant.

Referring to FIG. 6, there is shown an example of how such a configuration may be applied to the design of FIG. 4. In the illustrated example the layer of epoxy compound 56 shown in FIG. 4 is made of successive epoxy compound electrode segments 56a, 56b, 56c, ( ... ) deposited into the bottom groove 52. The successive epoxy compound electrode segments 56a, 56b, 56c, ( ... ) are separated by insulating sections 57a, 57b, ( ... ). In one variant, the bottom groove 52 may be machined leaving portions of the base plate 40 intact to define the insulating sections. Other variants may however be envisioned, such as providing blocks of insulting material within the bottom groove 52 to separated and insulate from each other the electrode segments 56a, 56b, 56c, ( ... ).

In other variants, instead of providing a progressively decreasing plasma-generating field the plasma-generating mechanism may be divided in two zones, an ignition zone proximate the gas inlet 36 where the plasma-generating field applied across the plasma chamber is high enough to ignite the plasma, and a maintenance zone where the applied field is smaller and designed to ensure the maintenance of the plasma discharge.

The emission-based detector may include additional features relevant to the packaging and operation of the plasma chamber 22 as well as providing light collecting and processing capabilities.

Referring back to FIG. 4, the emission-based detector according to the illustrated implementation includes a holder 62 shaped to fit over the base plate 40 on the top side. The holder 62 includes a round aperture 64 extending from top to bottom and aligned with the detection area 32, defining a light passage for the optical emissions from the plasma. In some variants, a light pipe made of a transparent material such as quartz may be used to carry the optical emissions from the plasma away from the plasma chamber, in particular in implementations where the plasma chamber reaches high temperatures which may be damaging to traditional optical components.

The emission-based detector 20 may further include an optical cartridge 66 coupled to the detector window 48 for collecting the optical emissions from the plasma exiting the plasma chamber 22. The optical cartridge 66 includes all the components required to acquire and optionally at least partially process light generated by the plasma in the plasma chamber 22. The optical cartridge 66 may for example include a photodiode 72 receiving light exiting the detector window 48 and converting this light to an electrical signal, for example processed by an electronic signal conditioning board 74. The photodiode 72 may include an operational amplifier having the required electronic gain. An optical filter 70 may be provided between the detector window 48 and the photodiode 72, to allow through only a spectral range of interest. The optical filter 70 may for example be embodied by an interferential filter or the like, and can for example be a bandpass filter centered on a wavelength or wavelength range to be monitored. It will be readily understood that in other variants different configurations could be used to extract the spectral information from the detected signal, such as for example using a spectrometer or other spectrally resolved detector to convert optical energy into analog or digital information.

The components of the optical cartridge 66 may be housed in a cartridge housing 67 closed by a cover 80 and having a projecting portion 68 shaped to fit within the round aperture 64 of the holder 62 and project towards the window 48. As will be readily understood by one skilled in the art, the optical cartridge 66 may include any number of additional components serving a mechanical, structural, electrical or optical function, such as for example O-ring 76 and isolating sleeve 78.

The output of the optical cartridge 66 may be connected to any suitable data processing system (not shown) to further process the signal and display the processed data. In some implementations, the outputted information may take the form of a single concentration value such as provided by an online gas analyser, or may be presented as a chromatogram signal such as obtained through chromatographic systems.

In an alternative embodiment (not shown), instead of mounting the photodiode directly over the window 48, the light from the window may be collected into an optical fiber guiding the collected light to an off-device photodiode. While such a configuration can involve a trade-off on sensitivity of the measurements, it may provide more versatility in wavelength selection and filtering.

Figure 7:
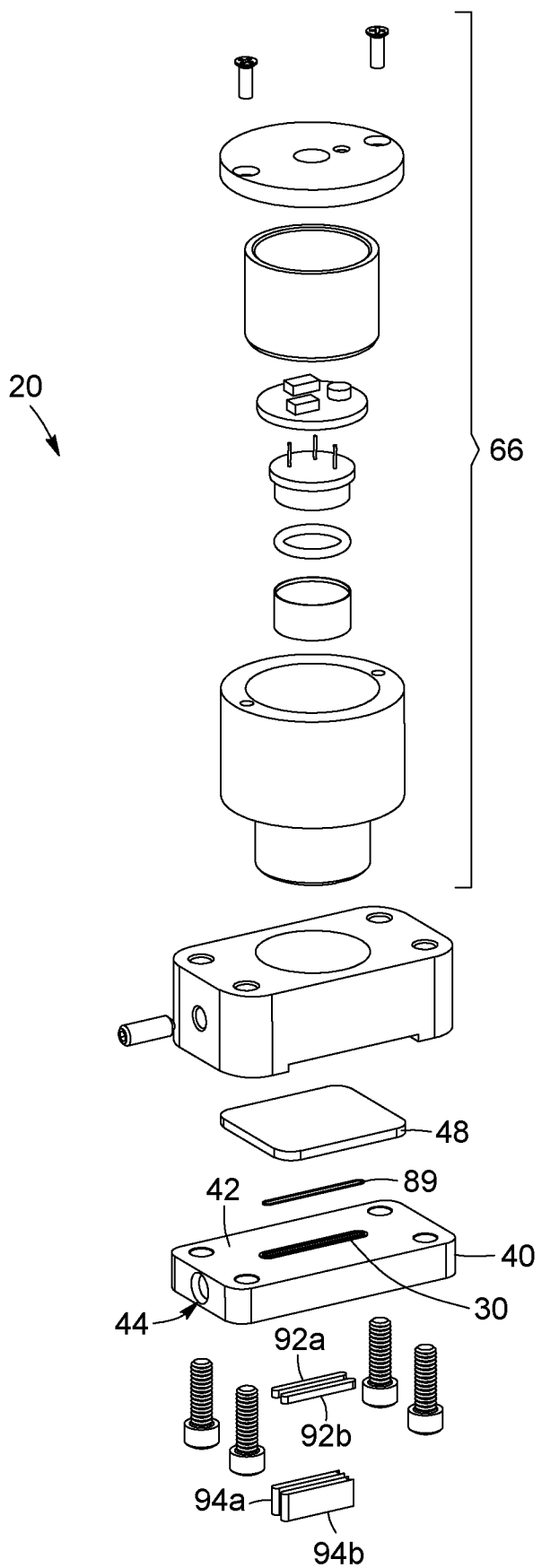
FIG. 7 is an exploded view of an emission-based detector according to another embodiment.
Figure 7A:
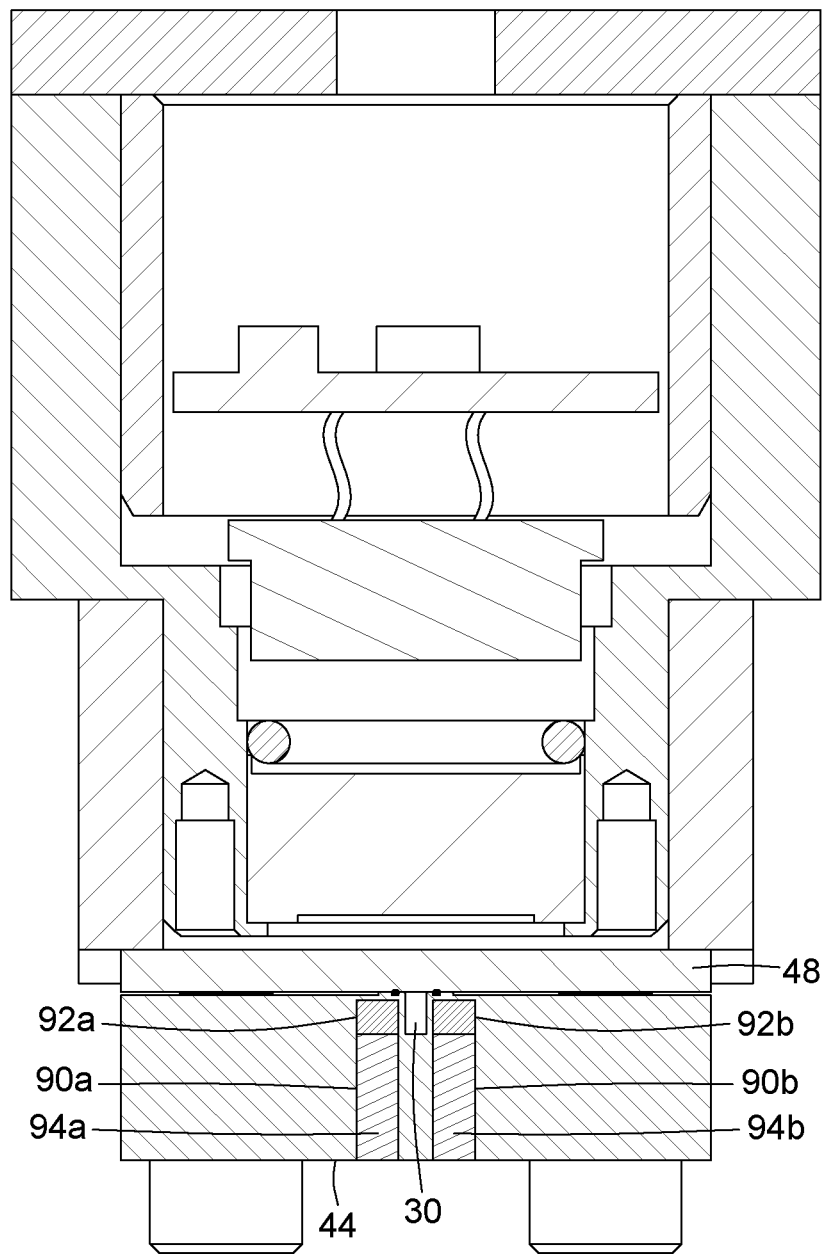
FIG. 7A is a cross-sectional view of the bottom portion of the emission-base detector of FIG. 7 taken transversally to the bottom plate.
Figure 7B:
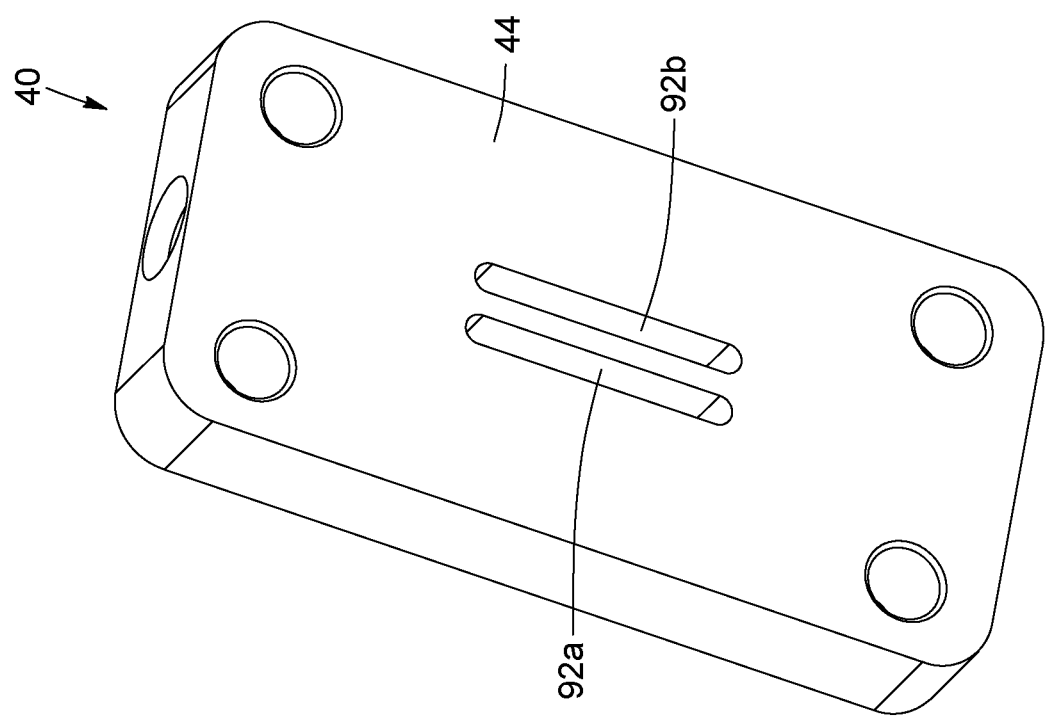
FIG. 7B is a bottom elevation view of the base plate of the emission-based detector of FIG. 7.

Referring to FIGS. 7, 7A and 7B, there is shown an emission-based detector 20 according to another embodiment. The illustrated variant differs from the variant of FIG. 4 in the configuration of the plasma-generating mechanism.

In this embodiment, the capillary channel 30 defines an elongated straight path forming a hollow depression in the top surface 42 of the base plate 40. The bottom surface 44 of the base plate 40 is machined to form a pair of parallel slits 90a, 90b. As best seen in FIG. 7A, the parallel slits 90a, 90b preferably extend deeply through the base plate 40 such that their deepest portions extend contiguously to the capillary channel 30, on either sides thereof. A pair of linear bottom electrodes 92a, 92b are provided in the parallel slits 90a, 90b, respectively, and lie collinearly to each other alongside the capillary channel. The linear bottom electrodes may for example be embodied by layers of conductive epoxy deposited in the deepest portion of the parallel slits 90a, 90b. The remaining free space in the parallel slits 90a, 90b is preferably filled with an insulating material such as an insulating epoxy 94a, 94b or silicon based potting compound.

In use, both the linear bottom electrodes 92a, 92b are connected to an AC voltage source (not shown) through electrical contacts (not shown) in order to create a plasma-generating field therebetween. As the capillary channel 30 extends between the linear bottom electrodes 92a, 92b, the flow of gas sample through the channel will be submitted to the plasma-generating field as explained above. The portions of the base plate 40 separating the capillary channel 30 from the linear bottom electrode 92a, 92b, may act as the dielectric barriers of DBD plasma-generating process. As will be readily understood by one skilled in the art, in this variant the plasma-generating field extends horizontally through the plasma chamber, as opposed to the vertically extending field of the previous embodiment. It will also be understood that there is no need for a conductive coating on the detector window 48 in this variants, as both electrodes extend laterally to the plasma chamber. An insulating compound 89 may be provided around the capillary channel 30, acting as a gasket, as will be readily understood by one skilled in the art.

Although the capillary channel 30 is shown as defining a straight path in the illustration of FIGS. 7 and 7A, it will be readily understood that in other variants it may define a winding path such as shown in previous embodiments. The bottom electrodes in such variants may for example extend linearly on the boundaries of the winding path, or follow a similar winding path as well.

Figure 8:
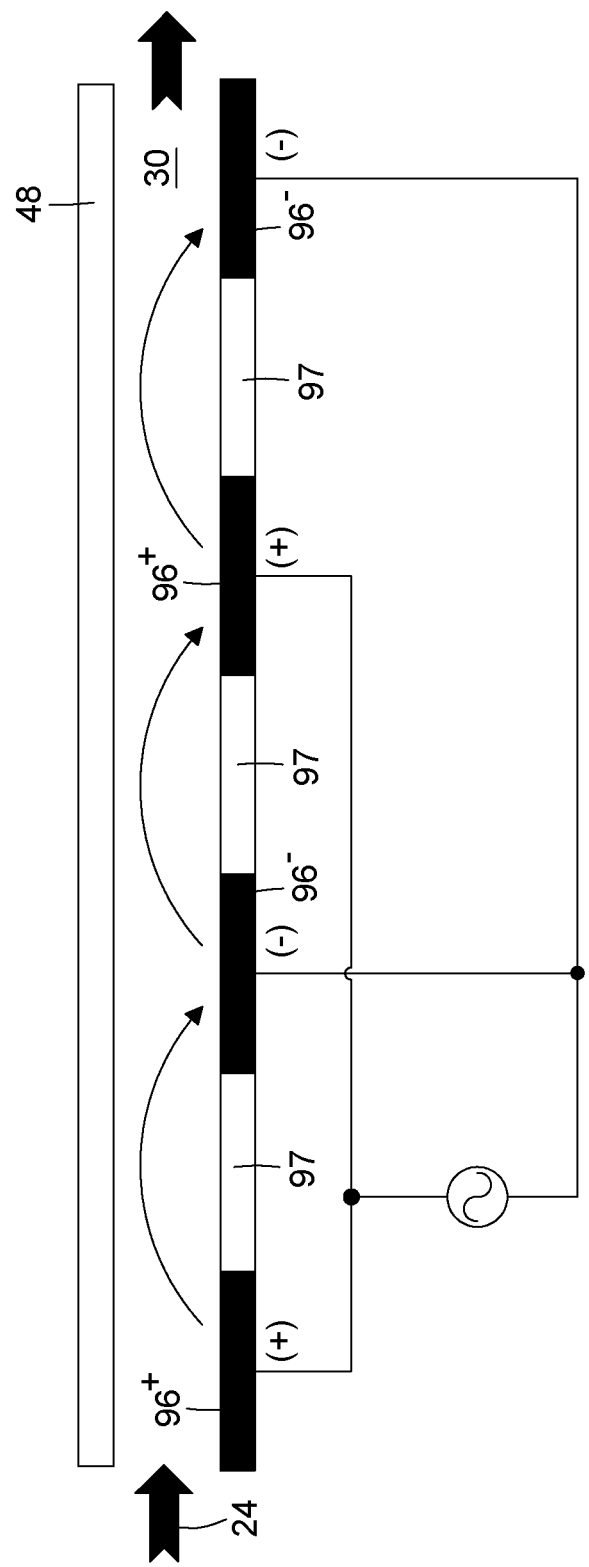
FIG. 8 is an electrical diagram showing the principle of operation of a plasma-generating mechanism based on a surface discharge over successive electrodes.
Figure 9:
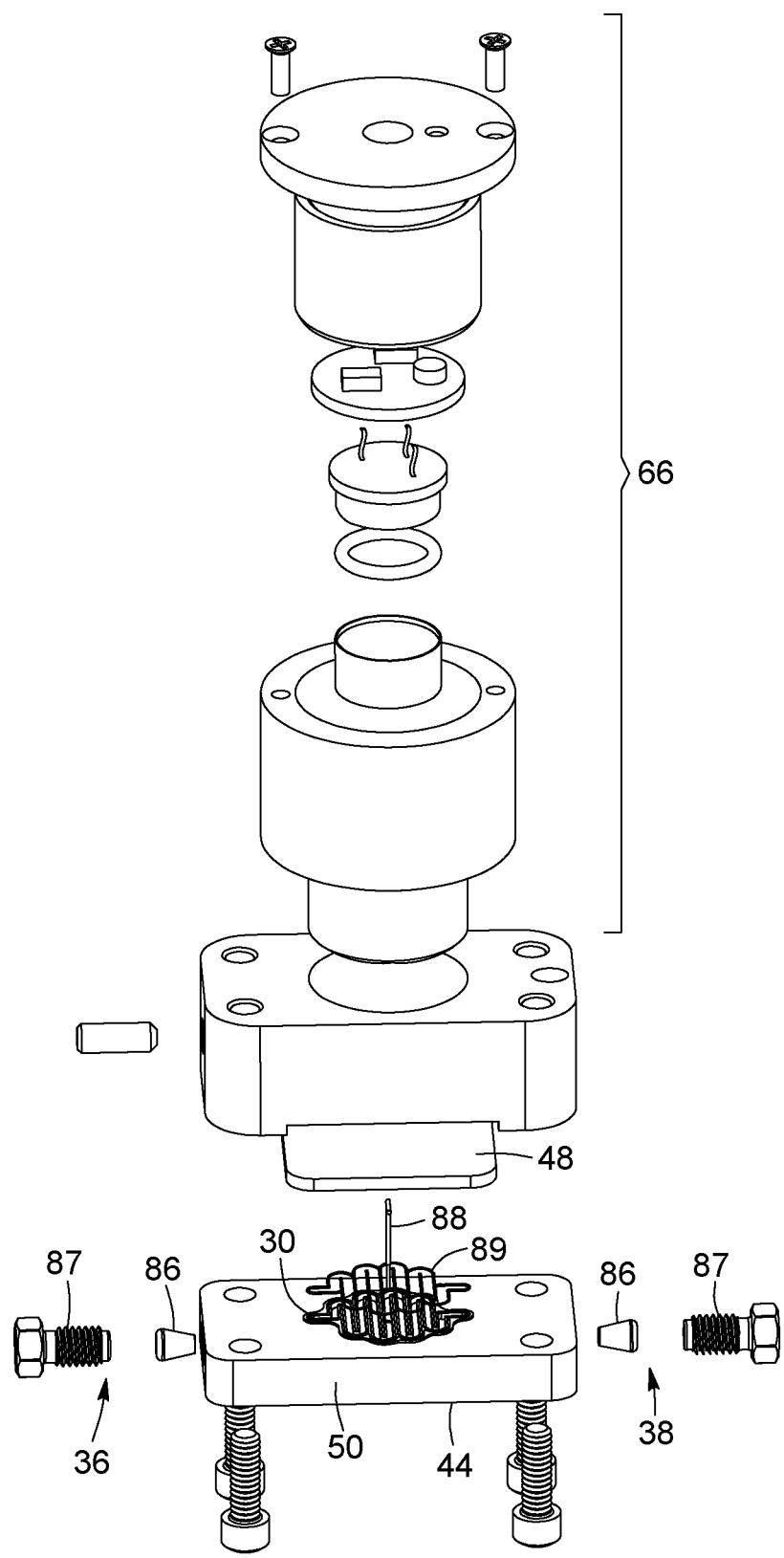
FIG. 9 is an exploded view of an emission-based detector according to yet another embodiment.
Figure 9A:
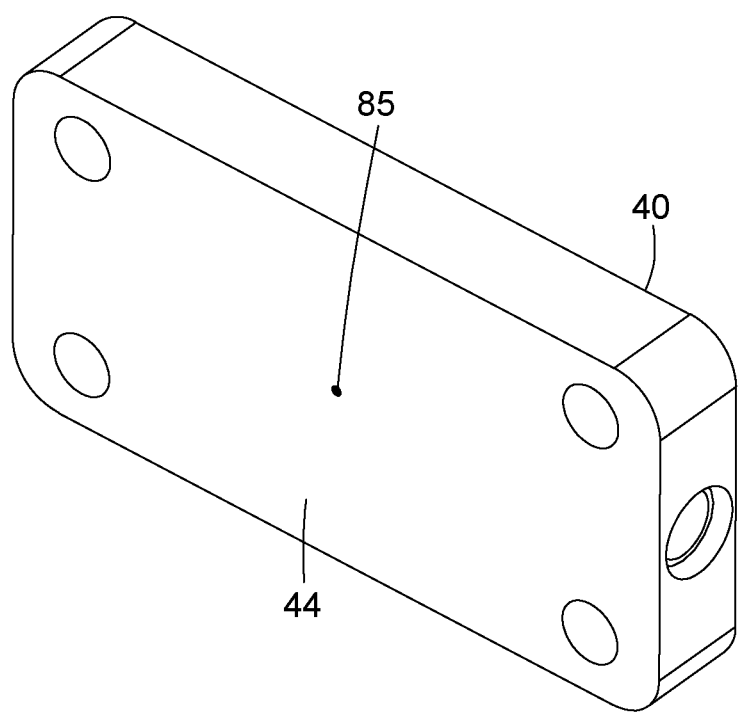
FIG. 9A is a bottom elevation view of the base plate of the emission-based detector of FIG. 9.
Figure 9B:
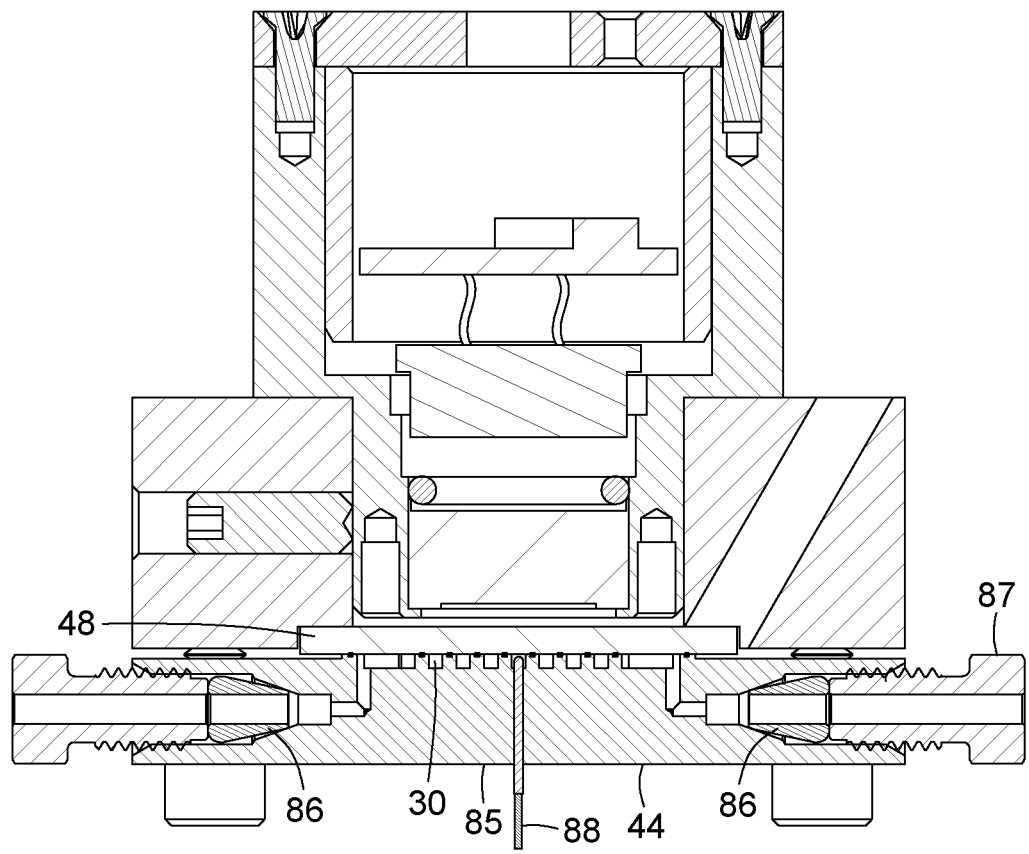
FIG. 9B is a cross-sectional view of the bottom portion of the emission-base detector of FIG. 9 taken longitudinally across the bottom plate.
Figure 9C:
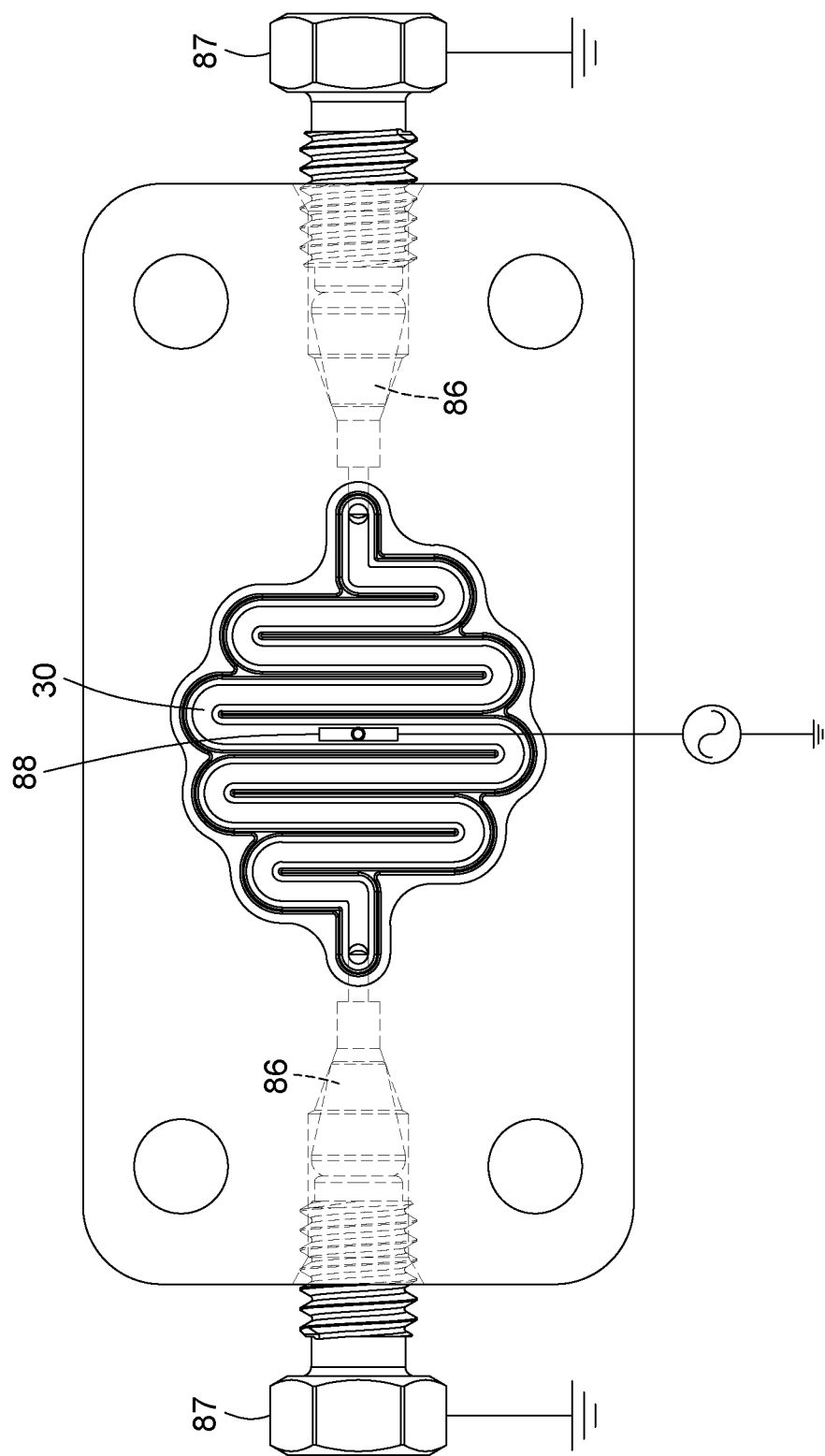
FIG. 9C is a top view of the base plate of the emission-based detector of FIG. 9.

It should be noted that in addition to the vertical and transversal plasma generating field configurations shown above in other variants the plasma generating field may be configured to generate a surface discharge along a linear path parallel to the field generating electrodes. This principle is schematically illustrated in FIG. 8. In such a configuration, the discharge electrodes may be embodied be sequential electrode segments 96⁺, 96⁻ of alternating polarities lying underneath the capillary channel 30, and separated by insulating regions 97. The electrical field generated between the different electrode segments 96⁺, 96⁻ can be controlled to generate a plasma within the vicinity of the surface of the electrodes. Advantageously, as with the embodiment of FIG. 7 such a configuration eliminates the need for a conductive coating on the detector window 48. In some variants, different electrode segments 96⁺, 96⁻ in the sequence may be operated under different current intensities such that the applied plasma-generating field has a greater intensity proximate the gas inlet than proximate the gas outlet.

With reference to FIGS. 9 and 9A to 9C, yet another configuration of a different plasma-generating mechanism is shown, again by way of example. This embodiment takes advantage of the fact that the gas inlet 36 and gas outlet 38 include metallic components, such as for example ferrules 86 and nuts 87 and connecting tubing. In this variant these metallic components are used as ground electrodes. A needle electrode 88 is further provided through a hole across the base plate 40 such that the needle electrode is inserted from the bottom surface 44 through a hole 85 and projects through within the plasma chamber as defined by the capillary channel 30. An alternating current is applied to the needle electrode as explained above. The potential difference between the needle electrode 88 and the ground electrodes at the gas inlet and gas outlet creates a horizontally extending plasma-generating field across the capillary channel 30. The needle electrode 88 may be coated with an insulating material, for example quartz, a polyimide such as KAPTON (trademark), ceramic, etc., the insulating coating defining the dielectric barrier of the BDB process. Again, this variant allows the use of a regular glass window without the need for a conductive coating. An insulating compound 89 may be provided around the capillary channel 30, acting as a gasket, as will be readily understood by one skilled in the art.

Multi-Cell Emission-Based Detector

For some applications, it may be desirable to measure optical emissions from a plasma at more than one wavelength, for example in order to optimize the sensitivity of the detection process for different impurities.

Figure 10:
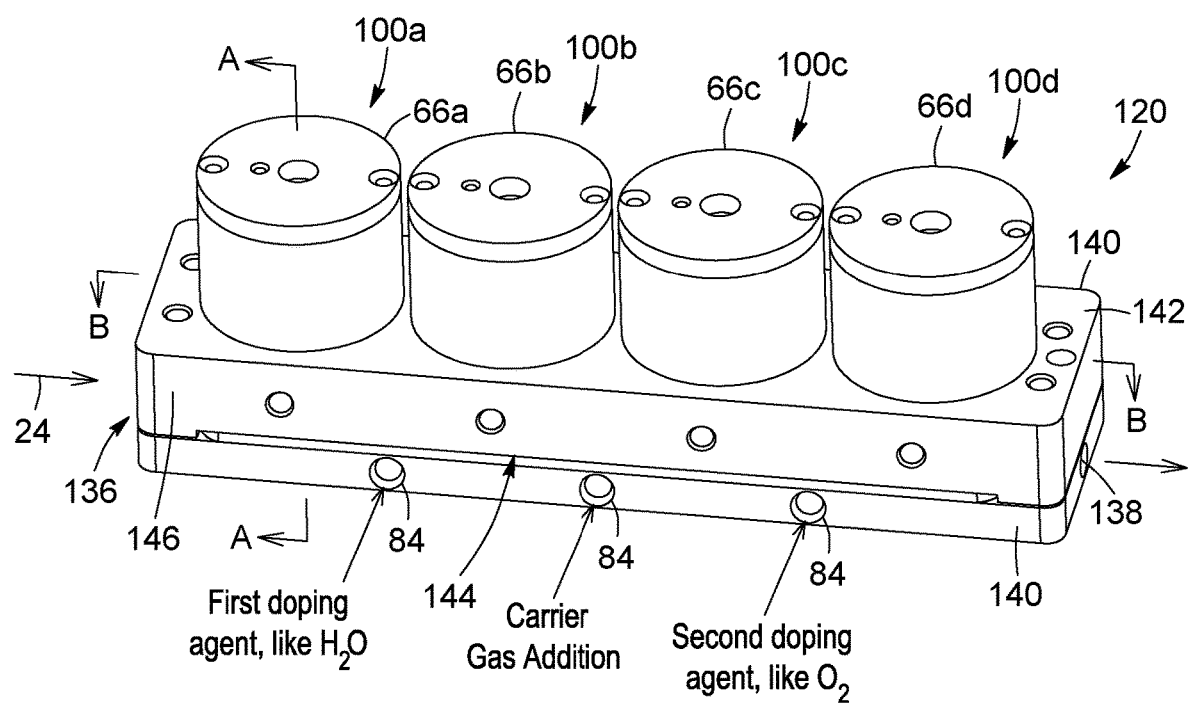
FIG. 10 is an elevation front view of a multi-cell emission-based detector according to one embodiment.
Figure 10B:
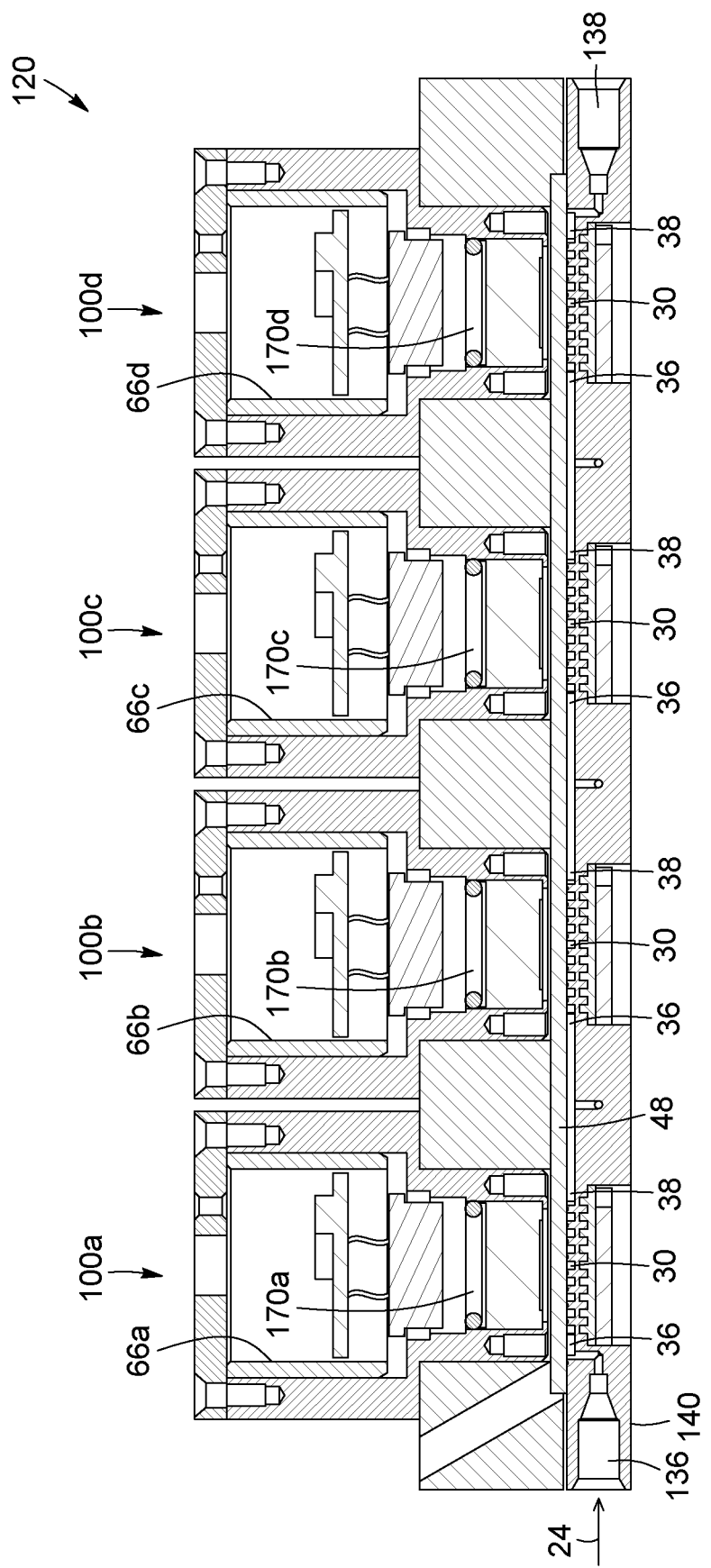
FIG. 10B is a cross-sectional view along lines B-B of the multi-cell emission-based detector of FIG. 10.

Referring to FIGS. 10, 10A and 10B, in accordance with one such implementation, there may be provided a multi-cell emission-based detector 120 for analysing a gas sample 24. As its name entails, the multi-cell emission-based detector 120 includes a plurality of detection cells 100a, 100b, 100c, 100d which are connected in series, that is, the detections cells 100a, 100b, 100c, 100d are configured such that the gas sample 24 traverses them successively one after the other. Although four detection cells 100a, 100b, 100c, 100d are shown in the illustration of FIG. 10, it will be readily understood that a different number of cells may be provided in other embodiments without departing from the scope of the invention.

With particular reference to FIGS. 10A and 10B, in the illustrated embodiment each detection cell 100a, 100b, 100c, 100d includes a detection area 32 having a gas inlet 36, a gas outlet 38 and a capillary channel 30 in fluid communication with the gas inlet 36 and gas outlet 38 to allow circulation of the gas sample 24 therebetween. As explained with respect to other embodiments, the capillary channel 30 defining a plasma chamber 22. In some implementations, the capillary channel 30 is of a similar construction as described above. The capillary channel 30 may therefore follow a winding path within the detection area 32, and this winding path may for example define a boustrophedonic or zigzag trajectory. In some variants, the gas inlet 36 may be configured to receive the gas sample 24 from a gas chromatography capillary column, and the capillary channel 30 may have transversal dimensions of a same order as this gas chromatography capillary column. In some examples, the capillary channel 30 may have transversal dimensions of about 0.5 mm² or less, or a cross-section area between about 0.01 mm² and 0.20 mm².

Each detection cell 100a, 100b, 100c and 100d of the multi-cell emission-based detector 120 further includes a plasma-generating mechanism configured to apply a plasma-generating field across the plasma chamber 22 so as to generate a plasma from the gas sample 24. The plasma-generating mechanism may be based on a DBD configuration such as one of those described above or be embodiment by different components as will be readily understood by one skilled in the art. A detector window 48 allowing optical emissions from the plasma in each detection cell 100a, 100b, 100c or 100d to exit the corresponding plasma chamber 22, and an optical cartridge 66a, 66b, 66c and 66d is coupled to the detector window of each detection cell for collecting the corresponding optical emissions.

In the illustrated embodiment of FIGS. 10, 10A and 10B, the multi-cell emission-based detector 120 includes a multi-cell stick 140 having a top surface 142, a bottom surface 144 and a side wall 146. The multi-cell stick 140 also has a plurality of grooves in its top surface 142 defining the capillary channels 30 of the detection cells 100a, 100b, 100c and 100d. In this implementation, the multi-cell stick 140 therefore serves as a common base plate for the detection cells 100a, 100b, 100c and 100d. As best seen in FIG. 10B, channels are provided through the multi-cell stick 140 to connect the detection cells 100a, 100b, 100c and 100d in series together and in series with a detector gas inlet 136 and a detector gas outlet 138.

It will be readily understood by one skilled in the art that each detection cell may be designed and controlled according to the target application, and the signals obtained from the different detection cells 100a, 100b, 100c and 100d may be processed individually or jointly. For example, each optical cartridge 66a, 66b, 66c, 66d may be provided with a corresponding optical filter 170a, 170b, 170c, 170d specifically designed or selected in view of the spectral properties of the gas to be detected by the corresponding cell 100a, 100b, 100c and 100d and the associated carrier gas. The optical filter 170a, 170b, 170c, 170d of each detection cell therefore has spectral properties differing from the spectral properties of the optical filters of other ones of the detection cells 100a, 100b, 100c and 100. For example, $N_2$ could be measured at 337.1 nm in an argon background or at 391 nm in helium, $O_2$ measured at 777.7 nm, etc. In some implementations, signals from different optical cartridges 66a, 66b, 66c, 66d could be subtracted, added, divided or multiplied, to enhance selectivity improve sensitivity or, for baseline or background compensation. Furthermore, the intensity of the plasma-generating field applied to one or more individual detection cells could be tuned to provide a soft ionization in order to minimize or avoid chemical reactions between various impurities, as soft ionisation generally does not generate enough energy to trigger strong chemical reactions. In this variant the plasma power is tuned so that the plasma is almost quenched. In this manner two impurities can be measured online, in a sample background, such as Argon or Helium.

Furthermore, as is known in the art, the use of a doping agent can enhance the detector performance for specific impurities. However, doping the carrier gas may at the same time have a detrimental effect on other impurity peaks by reducing the sensitivity of the system at the corresponding wavelengths. Also, depending of doping agent and its level, baseline noise may increase.

In accordance with the illustrated embodiment of FIGS. 10, 10A and 10B, to overcome this problem a doping gas may be added between consecutive cells. The multi-cell emission-based detector 120 may therefore include at least one doping inlet 84, each doping inlet 84 being provided between consecutive ones of the detection cells 100a, 100b, 100c, and 100d. The doping inlets may for example be embodied by a permeation or a "T" connection. For example, in the illustrated embodiment the first detection cell 100a may receive the gas sample with its original "pure" carrier gas only, and doping inlets 84 are provided between the first 100a and second 100b detection cells, the second 100b and third 100c detection cells and the third 100c and fourth 100d detection cells. In this manner, the first detection cell 100a may for example be used to measure an impurity peak which would otherwise be negatively affected by doping agents, while subsequent detection cells may be specifically dedicated to the detection of impurity peaks enhanced by doping gas. It will also be understood that the doping inlet need not be in use for each detection scheme, and may be left unconnected to a doping gas source if doping is unnecessary for a particular sample circulating through the multi-cell emission-based detector 120. Furthermore, in some implementations one or more of the doping inlets 84 may be used to inject additional carrier gas between two detection cells, such as indicated on FIG. 10. The additional carrier gas may be of a different type than the carrier gas at the inlet of the detector. Such an approach allows a mixed gas discharge to be obtained offering a control of the electron temperature.

In accordance with another aspect, there is also provided a method of analysing a gas sample which involves providing multiple detection cells as above, each configured to generate a plasma from the gas sample and to collect optical emissions from this plasma. The method further involves successively circulating the gas sample through each of the detection cells and adding a doping agent to the gas sample between circulation of the gas sample through consecutive detection cells. different optical properties of optical emissions collected from different ones of the detection cells are measured.

Figure 11:
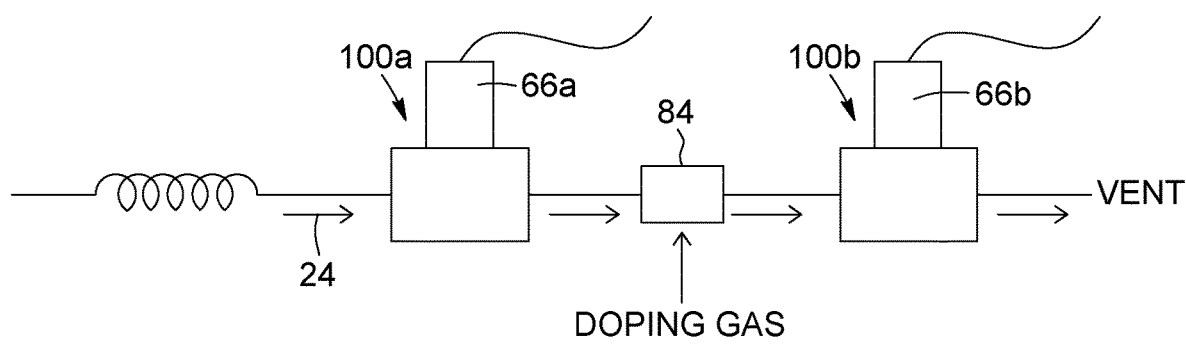
FIG. 11 is schematized representation of the principle of operation of a method of analysing a gas sample using a multi-cell emission-based detector according to an embodiment.

By way of example, FIG. 11 show a two-cell configuration which may be used to implement the method above according to one embodiment. This variant includes two detection cells 100a, 100b in series and a doping inlet 84 therebetween. In this example, the first detection cell 100a may be used without a doping gas to detect one type of impurities, whereas the second detection cell 100b may be used with a doped carrier gas in order to better detect another type of impurities. The optical cartridge 66a, 66b associated with each detection cell 100a, 100b is preferably adapted in view of the spectral characteristics of the corresponding impurities. It will be readily understood that in other implementations a different number of cells and a different doping scheme may be used without departing from the scope of the invention. In some variants, the measuring step above may involve measuring an impurity peak that is negatively affected by a given doping agent using a detection cell through which the gas sample circulates prior to the adding of the doping agent. In some variants, the doping scheme may involve adding a different doping agent between circulation of the gas sample through different consecutive ones of the detection cells, each doping agent enhancing detection of a different impurity peak in the gas sample.

Figure 12A:
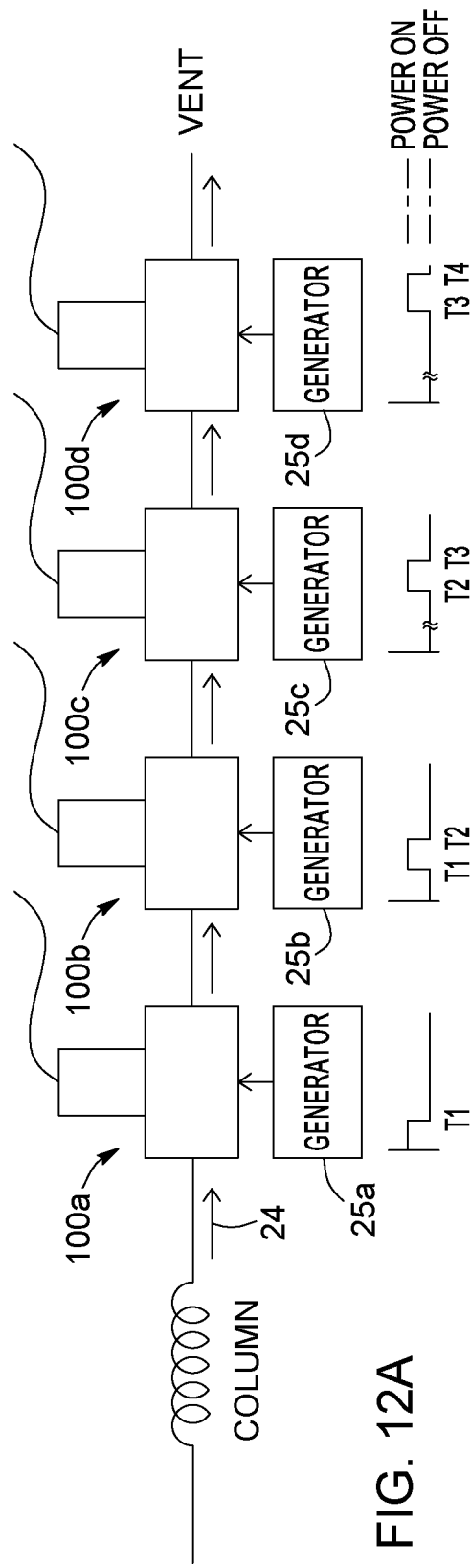
FIGS. 12A and 12B are schematized representations of methods of analysing a gas sample using time-controlled operation of the detection cells of a multi-cell emission-based detector according to some variants.
Figure 12B:
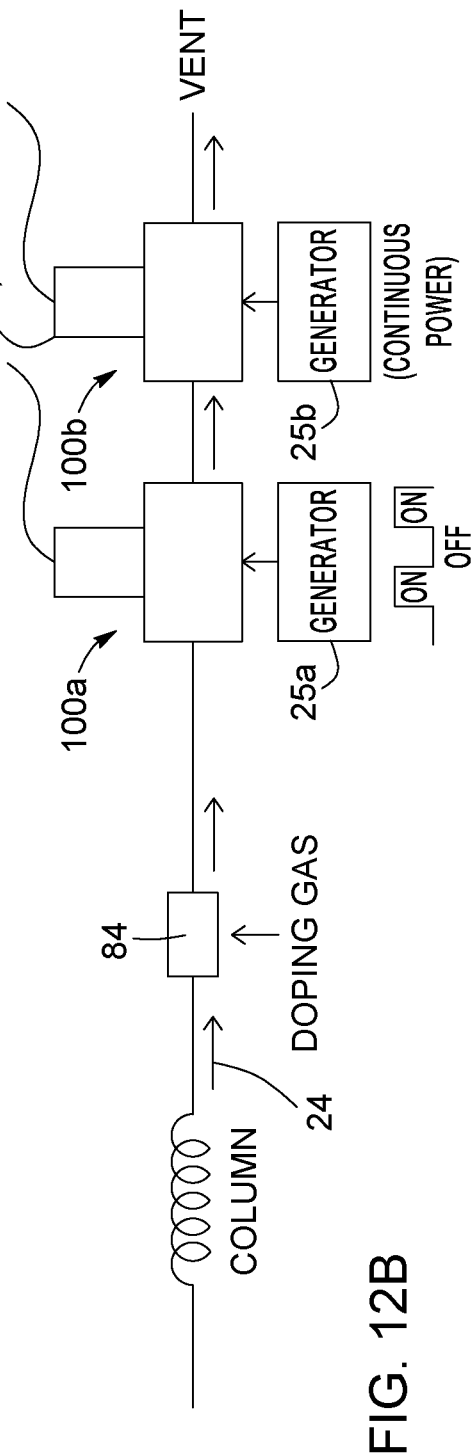

Referring to FIG. 12A there is shown a configuration adapted for multiple wavelength or emission band measurements. In this configuration, the power fed to the discharge electrodes by respective generators 25, 25b, 25c and 25d may be sequentially applied to the consecutive detection cells 100a, 100b, 100c, 100d, so that a plasma is generated in a given detection cell only when the desired impurity peak traverses that cell. In other words, this approach can avoid or minimize chemical interference between the different sample peaks. Such an embodiment may in some variant be combined with an inter-cell doping scheme such as described above. FIG. 12B shows another variant having two detection cells 100a and 100b, where the power fed to the first detection cell 100a is pulsed whereas a continuous power is applied to the second different cell 100b. In such a configuration, the signal output will follow the signal modulation of the first plasma. The signal output of the second plasma is demodulated in synchronisation with the first generator, like in a servo-lock amplifier, with the resulting benefit of reducing noise.

Of course, numerous modifications could be made to the embodiment described above without departing from the scope of the present invention.

The invention claimed is:
1. An emission-based detector for analysing a gas sample from a chromatography capillary column, comprising:
a detection area having a gas inlet, a gas outlet and a capillary channel in fluid communication with the gas inlet and gas outlet to allow circulation of the gas sample therebetween, the capillary channel having a cross-section area between about 0.01 $mm^2$ and 0.20 $mm^2$ and defining a plasma chamber, the plasma chamber following a winding path within the detection area, the capillary channel having a length within the detection area such that a path of the gas sample within said detection area substantially corresponds to a width of an impurity peak in said gas sample;

a plasma-generating mechanism configured to apply a plasma-generating field across the plasma chamber so as to generate a plasma from said gas sample; and a detector window allowing optical emissions from said plasma to exit the plasma chamber.

2. The emission-based detector according to claim 1, wherein said winding path defines a boustrophedonic or zigzag trajectory.

3. The emission-based detector according to claim 1, wherein the gas inlet is configured to receive the gas sample from the gas chromatography capillary column, and the capillary channel has transversal dimensions of a same order as said gas chromatography capillary column.

4. The emission-based detector according to claim 1, wherein the capillary channel has transversal dimensions of about 0.5 mm$^2$ or less.

5. The emission-based detector according to claim 1, wherein the plasma-generating mechanism relies on a Dielectric Barrier Discharge.

6. The emission-based detector according to claim 1, wherein the plasma-generating mechanism is further configured such that the applied plasma-generating field has a greater intensity proximate the gas inlet than proximate the gas outlet.

7. The emission-based detector according to claim 6, wherein the plasma-generating mechanism is further configured such that the intensity of the applied plasma-generating field decreases progressively along the capillary channel from the gas inlet to the gas outlet.

8. The emission-based detector according to claim 1, comprising a base plate having a top surface, a bottom surface and a side wall, said base plate having a groove in said top surface defining the capillary channel.

9. The emission-based detector according to claim 8, wherein the detector window extends on the top surface of the base plate and closes-off the groove to form said plasma chamber.

10. The emission-based detector according to claim 9, wherein the plasma-generating mechanism forms a Dielectric Barrier Discharge configuration comprising:

a top discharge electrode defined by a conductive coating extending over the detector window;

a top dielectric barrier defined by said detector window; and a bottom dielectric barrier defined by the base plate underneath the capillary channel; and a bottom discharge electrode defined by a layer of conductive epoxy compound extending along the bottom surface of the base plate.

11. The emission-based detector according to claim 10, wherein the base plate comprises a bottom cavity extending in the bottom surface underneath the capillary channel, the layer of conductive epoxy compound defining the bottom discharge electrode extending within said bottom cavity.

12. The emission-based detector according to claim 11, further comprising a bottom groove extending inside the bottom cavity and in line with the capillary channel.

13. The emission-based detector according to claim 10, wherein the plasma-generating mechanism comprises an AC generator connected to the top and bottom discharge electrodes so as to apply an electrical field therebetween.

14. The emission-based detector according to claim 1, wherein the plasma-generating mechanism comprises a pair of electrodes extending on either sides of the capillary channel.

15. The emission-based detector according to claim 1, wherein the plasma-generating mechanism comprises a pair of ground electrodes defined by metallic components associated with the gas inlet and the gas outlet, and a needle electrode projecting within the plasma chamber, the needle electrode being coated with an insulating material.

16. The emission-based detector according to claim 1, further including an optical cartridge coupled to the detector window for collecting the optical emissions from the plasma exiting the plasma chamber.

17. A multi-cell emission-based detector for analysing a gas sample from a chromatography capillary column, comprising:

a plurality of detection cells connected in series, each detection cell comprising:

a detection area having a gas inlet, a gas outlet and a capillary channel in fluid communication with the gas inlet and gas outlet to avow circulation of the gas sample therebetween, the capillary channel defining a plasma chamber, the plasma chamber following a winding path within the detection area, the capillary channel of each detection cell has a length within the detection area such that a path of the gas sample within said detection area substantially corresponds to a width of and impurity peak in said gas sample;

a plasma-generating mechanism configured to apply a plasma-generating field across the plasma chamber so as to generate a plasma from said gas sample;

a detector window allowing optical emissions from said plasma to exit the plasma chamber; and an optical cartridge coupled to the detector window for collecting said optical emissions.

18. The multi-cell emission-based detector according to claim 17, wherein the optical cartridge of each detection cell comprises an optical filter having spectral properties differing from the spectral properties of the optical filters of other ones of said detection cells.

19. The multi-cell emission-based detector according to claim 17, comprising a multi-cell stick having a top surface, a bottom surface and a side wall, said multi-cell stick having a plurality of grooves in said top surface defining the capillary channels of the detection cells.

20. The multi-cell emission-based detector according to claim 17, further comprising at least one doping inlet, each doping inlet being provided between consecutive ones of said detection cells.

21. The multi-cell emission-based detector according to claim 17, wherein said winding path defines a boustrophedonic or zigzag trajectory.

22. The multi-cell emission-based detector according to claim 17, wherein the capillary channel of each detection cell has transversal dimensions of a same order as said gas chromatography capillary column.

23. The multi-cell emission-based detector according to claim 17, wherein the capillary channel of each detection cell has transversal dimensions of about 0.5 mm$^2$ or less.

24. The multi-cell emission-based detector according to claim 17, wherein the capillary channel of each detection cell has a cross-section area between about 0.01 mm$^2$ and 0.20 mm2.

* * * * *